(12) United States Patent
Liu et al.

(10) Patent No.: US 12,114,297 B2
(45) Date of Patent: Oct. 8, 2024

(54) CONFIGURATION METHOD AND APPARATUS FOR FRAME STRUCTURE, AND STORAGE MEDIUM

(71) Applicant: ZTE Corporation, Shenzhen (CN)

(72) Inventors: Wenhao Liu, Shenzhen (CN); Youxiong Lu, Shenzhen (CN); Ting Miao, Shenzhen (CN); Feng Bi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 749 days.

(21) Appl. No.: 17/281,079

(22) PCT Filed: Sep. 25, 2019

(86) PCT No.: PCT/CN2019/107768
§ 371 (c)(1),
(2) Date: Mar. 29, 2021

(87) PCT Pub. No.: WO2020/063651
PCT Pub. Date: Apr. 2, 2020

(65) Prior Publication Data
US 2021/0345324 A1    Nov. 4, 2021

(30) Foreign Application Priority Data
Sep. 27, 2018   (CN) .......................... 201811133663.5

(51) Int. Cl.
*H04W 72/20*   (2023.01)
*H04W 24/10*   (2009.01)
(Continued)

(52) U.S. Cl.
CPC ....... *H04W 72/0446* (2013.01); *H04W 24/10* (2013.01); *H04W 52/367* (2013.01);
(Continued)

(58) Field of Classification Search
None
See application file for complete search history.

(56) References Cited

U.S. PATENT DOCUMENTS

| 8,094,550 | B2 * | 1/2012 | Winter | H04L 69/24 370/503 |
| 11,805,473 | B2 * | 10/2023 | Breuer | H04W 72/0453 |
| 2019/0349079 | A1 * | 11/2019 | Novlan | H04B 7/15542 |

FOREIGN PATENT DOCUMENTS

| CN | 108023671 A | 5/2018 | |
| WO | WO-2017201674 A1 * | 11/2017 | ........... H04B 7/2656 |
| WO | 2018026665 A1 | 2/2018 | |

OTHER PUBLICATIONS

CMCC., "Discussion on Backhaul Signaling Exchange for NR Frame Structure", R3-180327, 3GPP TSG-RAN WG3 NR AdHoc 1801, Jan. 26, 2018.
(Continued)

*Primary Examiner* — Ajit Patel
(74) *Attorney, Agent, or Firm* — CANTOR COLBURN LLP

(57) ABSTRACT

Provided are a configuration method and apparatus for a frame structure, and a storage medium. The configuration method for the frame structure includes: receiving, by a first node, frame structure parameters configured by a second node, wherein each frame structure parameter comprises: a period and a type of a frame structure, and the frame structure parameters comprise a common frame structure parameter, a first dedicated frame structure parameter and a second dedicated frame structure parameter; obtaining, by the first node, an uplink/downlink division of the frame structure according to the common frame structure parameter and/or the first dedicated frame structure parameter, and determining, according to the second dedicated frame structure parameter by the first node, the frame structure for
(Continued)

A first node receives frame structure parameters configured by a second node — S502

The first node obtains an uplink/downlink division of a frame structure according to the common frame structure parameter and/or the first dedicated frame structure parameter, and determines, according to the second dedicated frame structure parameter, the frame structure for uplink transmission of a backhaul link and the frame structure for downlink transmission of the backhaul — S504 uplink transmission of a backhaul link and the frame structure for downlink transmission of the backhaul link.

20 Claims, 4 Drawing Sheets

(51) Int. Cl.
    *H04W 52/36*     (2009.01)
    *H04W 72/0446*     (2023.01)
    *H04W 72/1268*     (2023.01)
    *H04W 72/23*     (2023.01)
    *H04W 84/04*     (2009.01)
    *H04W 92/24*     (2009.01)

(52) U.S. Cl.
    CPC ....... *H04W 72/1268* (2013.01); *H04W 72/23* (2023.01); *H04W 92/24* (2013.01)

(56) References Cited

OTHER PUBLICATIONS

International Search Report for corresponding application PCT/CN2019/107768 filed Sep. 25, 2019; Mail date Dec. 30, 2019.
ZTE. "Discussion in IAB Node Resource Allocation", R2-1807402, 3GPP TSG-RAN WG2 Meeting #102, May 25, 2018.
ZTE. "Overview of physical layer enhancements for IAB", R1-1806024, 3GPP TSG RAN WG1 Meeting #93, May 25, 2018, pp. 1-9.
AT &T, 3GPP TSG RAN WG1 Meeting #94, Gothenburg, Sweden, Aug. 20-24, 2018, R1-1809941.
AT&T, Summary of 7.2.3.1 Enhancements to Support NR Backhaul links, 3GPP TSG RAN WG1 Meeting #94, Gothenburg, Sweden, Aug. 20-24, 2018, R1-1809103.
Huawei, Relay frame structure design of TDD mode, 3GPP TSG RAN WG1 Meeting #56bis Seoul, Korea, Mar. 23-27, 2009, R1-091270.
Qualcomm Inc, , 3GPP TSG RAN WG1 Meeting #94, Gothenburg, Sweden, Aug. 20-24, 2018, R1-1809442.

* cited by examiner

CONFIGURATION METHOD AND APPARATUS FOR FRAME STRUCTURE, AND STORAGE MEDIUM

CROSS REFERENCE

This application is a National Stage Filing of the PCT International Application No. PCT/CN2019/107768 filed on Sep. 25, 2019, which claims priority to Chinese Application No. 201811133663.5 filed on Sep. 27, 2018, the entirety of which is herein incorporated by reference.

TECHNICAL FIELD

The present disclosure relates to the field of communications.

BACKGROUND

One potential technology for future network deployments is to support wireless backhaul to enable flexible and dense deployments of New Radio (NR) cells without the necessity of deploying the transmission networks based on scaling. Compared with Long Term Evolution (LTE), a larger bandwidth and the deployment of a massive Multiple Input Multiple Output (massive MIMO) or a multi-beam system can be expected for the NR cell. In this way, there would be an opportunity to deploy in the NR network an Integrated Access Backhaul (IAB) based on a control channel and a service channel of an access link in an integrated manner, so as to simplify the dense network deployment.

In an IAB network in the related art, there are problems that configuration of a frame structure may cause interference between nodes and incapability of performing operations of transmitting and receiving data at the same time.

SUMMARY

Embodiments of the present disclosure provide a configuration method and apparatus for a frame structure, and a storage medium.

According to one aspect of the embodiments of the present disclosure, a configuration method for a frame structure is provided, including the following operations. A first node receives frame structure parameters configured by a second node, wherein each frame structure parameter includes a period and a type of the frame structure, and the frame structure parameters include a common frame structure parameter, a first dedicated frame structure parameter and a second dedicated frame structure parameter. The first node obtains an uplink/downlink division of the frame structure according to the common frame structure parameter and the first dedicated frame structure parameter, and determines, according to the second dedicated frame structure parameter, the frame structure for uplink transmission of a backhaul link and the frame structure for downlink transmission of the backhaul link.

According to another aspect of the embodiments of the present disclosure, a configuration method for a frame structure is provided, including the following operations. A second node configures frame structure parameters for a first node, wherein each frame structure parameter includes: a period and a type of a frame structure, and the frame structure parameters include a common frame structure parameter, a first dedicated frame structure parameter and a second dedicated frame structure parameter. The common frame structure parameter and the first dedicated frame structure parameter are used for obtaining an uplink/downlink division of the frame structure, and the second dedicated frame structure parameter is used for determining the frame structure for uplink transmission of a backhaul link and the frame structure for downlink transmission of the backhaul link.

According to still another aspect of the embodiments of the present disclosure, a configuration apparatus for a frame structure is provided, which is applied to a first node and includes a receiving module and a processing module. The receiving module is configured to receive frame structure parameters configured by a second node, wherein each frame structure parameter includes a period and a type of a frame structure, and the frame structure parameters include a common frame structure parameter, a first dedicated frame structure parameter and a second dedicated frame structure parameter. The processing module is configured to obtain an uplink/downlink division of the frame structure according to the common frame structure parameter and the first dedicated frame structure parameter, and determine, according to the second dedicated frame structure parameter, the frame structure for uplink transmission of a backhaul link and the frame structure for downlink transmission of the backhaul link.

According to still another aspect of the embodiments of the present disclosure, a configuration apparatus for a frame structure is provided, which is applied to a second node and includes a configuring module. The configuring module is configured to configure frame structure parameters for a first node, wherein each frame structure parameter includes a period and a type of a frame structure, and the frame structure parameters include a common frame structure parameter, a first dedicated frame structure parameter and a second dedicated frame structure parameter. The common frame structure parameter and the first dedicated frame structure parameter are used for obtaining an uplink/downlink division of the frame structure, and the second dedicated frame structure parameter is used for determining the frame structure for uplink transmission of a backhaul link and the frame structure for downlink transmission of the backhaul link.

According to another aspect of the embodiments of the present disclosure, a storage medium is also provided. The storage medium stores a computer program, wherein the computer program is configured to execute the operations in any one of the method embodiments at runtime.

According to another aspect of the embodiments of the present disclosure, a storage medium is also provided. The storage medium stores a computer program, wherein the computer program is configured to execute the operations in any one of the method embodiments at runtime.

BRIEF DESCRIPTION OF THE DRAWINGS

The accompanying drawings described herein are used to provide a deeper understanding of the present disclosure, and constitute a part of the present application. The exemplary embodiments of the present disclosure and the description thereof are used to explain the present disclosure. The drawings and the exemplary embodiment do not constitute limitations to the present disclosure. In the drawings.

DETAILED DESCRIPTION OF THE EMULSIONS

The present disclosure is described below in detail with reference to the drawings and in conjunction with the embodiments. It is to be noted that embodiments in the present application and characteristics in the embodiments may be combined to derive other embodiments not explicitly described.

It is to be noted that the terms "first", "second" and the like in the specification, the claims and the drawings of the present disclosure are used to distinguish similar objects, and are not used to describe a specific sequence or a precedence order.

Figure 1:
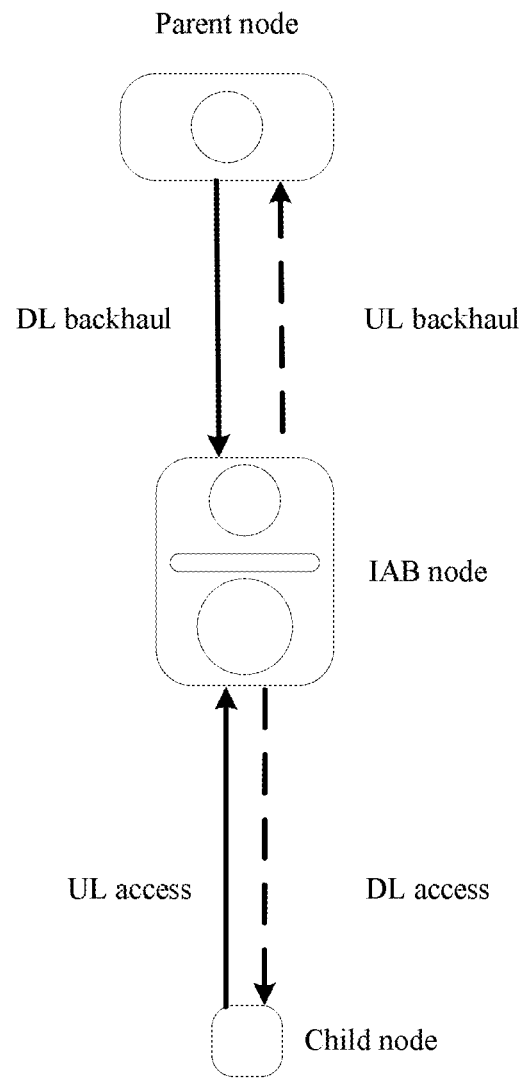
FIG. 1 is a schematic diagram showing the relation between various nodes in an IAB network and links in the IAB network in the related art.

FIG. 1 is a schematic diagram showing the relation between various nodes in an IAB network and links in the IAB network in the related art. As shown in FIG. 1, the three nodes from top to bottom are respectively referred to as a Parent node, an IAB node and a Child node. Taking the IAB node as a current node seen as a reference, the upper-level node of the IAB node is the Parent node. The link between the current IAB node and its Parent node is referred to as a backhaul link. According to the transmission direction, the backhaul link is further divided into a backhaul downlink (DL) and a backhaul uplink (UL). The link between the current IAB node and its Child node is referred to as an access link. According to the transmission direction, the access link is divided into an access downlink (DL) and an access uplink (UL).

The determination of the link type is implemented based on the relative relation between the nodes and the roles of the nodes. If the Child node in FIG. 1 is a common terminal, the corresponding link is a common access link for the Child node. If the Child node in FIG. 1 is an IAB node, the corresponding link is a backhaul link from the perspective of the IAB node. The link may be further subdivided into backhaul downlink/uplink for the Child node and access downlink/uplink for the ordinary UE.

Figure 2:
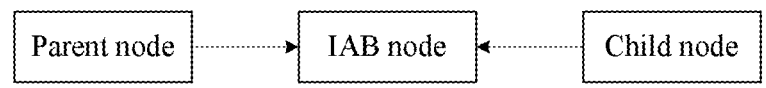
FIG. 2 is a schematic diagram of access link and backhaul link multiplexing of an IAB in a time-domain, a frequency-domain or a space domain in the related art.
Figure 2:
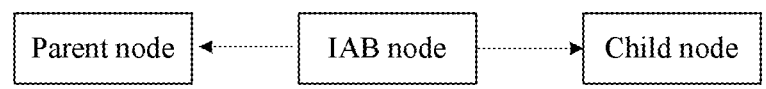

FIG. 2 is a schematic diagram of access link and backhaul link multiplexing of an IAB in a time-domain, a frequency-domain or a space domain in the related art. As shown in FIG. 2, the access link and the backhaul link may be based on the same frequency (in-band) or based on the same frequency (out-band). The effective support for out-band relay is important for certain NR deployment scenarios, and is also important for the understanding of the interference coordination of half-duplex in an in-band scenario.

In an NR-15 system, a frame structure is configured for a terminal via high-layer signaling. The existing types of the frame structure include L, UL and F (Flexible). The frame structure is configured by a Next-generation node B (gNB). The gNB is directly connected to a core network, and the gNB autonomously configures the frame structure for the terminal that the gNB serves.

In stage Rd-16, 3GPP conference discusses effective multiplexing for access link and backhaul link.

The IAB network is required to support the following features: 1) supporting multi-hop transmission, which means that transmission of more than two hops needs to be supported, for example, transmission of only two hops, i.e., base station-relay-UE, is supported in the LTE relay network, while the next level of the IAB node may also be an IAB node in the NR IAB network; 2) half-duplex transmission, it is not assumed in an IAB network that an IAB node can perform simultaneous reception and transmission. For example, in a TDD duplex (time division duplex) mode, the IAB node cannot perform simultaneous transmission and reception operations, but access is not excluded.

In an IAB network, the configuration states of the frame structure have additional requirements compared with an NR Rel-15 network.

When configuring the frame structure for a lower-level node, there is a state other than the UL/DL/F state. For example, the IAB node does not receive data from the upper-level node while transmitting data to the lower-level node, and does not receive data transmitted from the lower-level node while transmitting data to the upper-level node, that is, the two operations cannot be performed at the same time.

Figure 3:
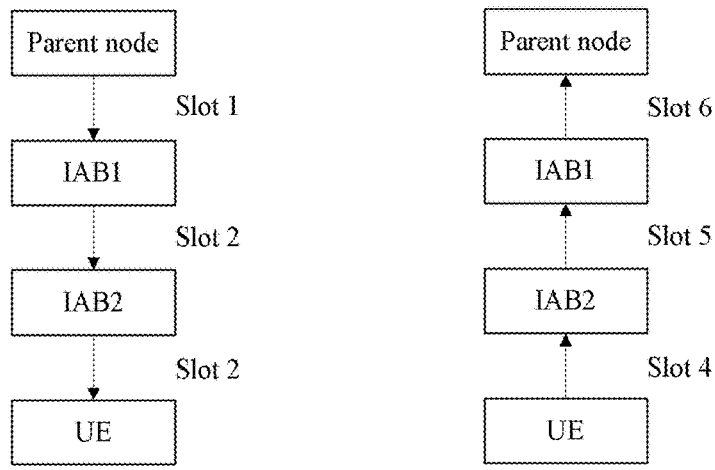
FIG. 3 is a schematic diagram of time division transmission in a three-hop network in the related art.

The approach shown in FIG. 2 is inefficient for an IAB network that supports multi-hop links. FIG. 3 is a schematic diagram of time division transmission taking a three-hop network as an example in the related art. As shown in FIG. 3, six slot resources are consumed in order to support one transmission and feedback of a UE.

Figure 4:
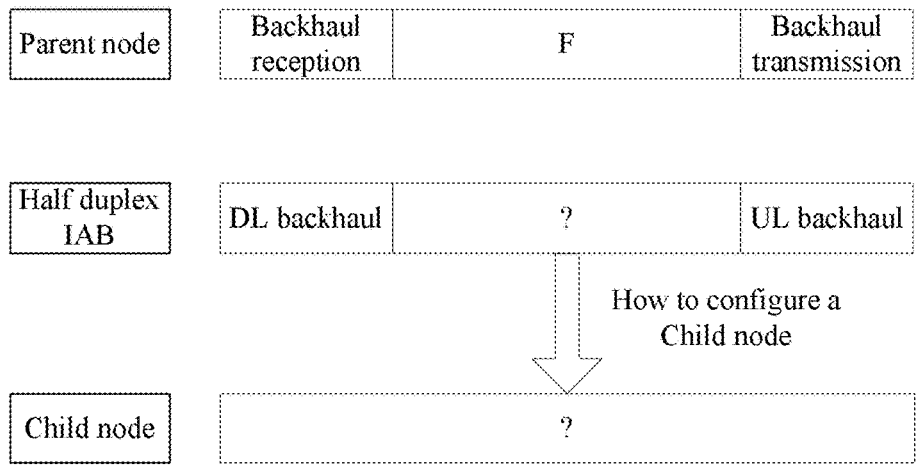
FIG. 4 is a schematic diagram of configuring potential time-domain transmitting and receiving resources for an IAB node by a Parent node in the related art.

In addition, in the time division transmission solution, it is also unclear how to ensure effective resource allocation for both the backhaul link and the access link in each level of nodes in the transmission process of multiple levels of relay nodes. FIG. 4 is a schematic diagram of configuring potential time-domain transmission and reception resources for an IAB node by a Parent node in the related art. As shown in FIG. 4, the Parent node configures potential time-domain transmission and reception resources for an IAB node. However, for the IAB node, there are uncertain factors for how to configure the lower-level node, for example, when the Parent node configures for the IAB node on how to use the F resources, if the IAB node configures arbitrarily, interference may be generated between the nodes.

Hereinafter, the embodiments of the present disclosure which may solve the above problems in the related art will be described in detail.

Embodiment 1

Figure 5:
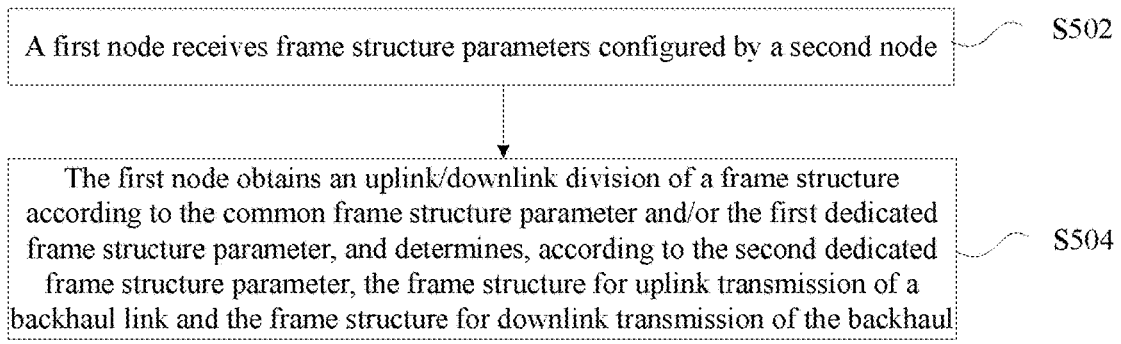
FIG. 5 is a flowchart of a configuration method for a frame structure according to an embodiment of the present disclosure.

A configuration method for a frame structure is provided in the present embodiment. FIG. 5 is a flowchart of a configuration method for a frame structure according to an embodiment of the present disclosure. As shown in FIG. 5, the flow includes the following operations S502 and S504.

In operation S502, a first node receives frame structure parameters configured by a second node, wherein each frame structure parameter includes a period and a type of a frame structure, and the frame structure parameters include a common frame structure parameter, a first dedicated frame structure parameter and a second dedicated frame structure parameter.

In operation S504, the first node obtains an uplink/downlink division of the frame structure according to the common frame structure parameter and the first dedicated frame structure parameter, and determines, according to the second dedicated frame structure parameter, the frame structure for uplink transmission of a backhaul link and the frame structure for downlink transmission of the backhaul link.

Through the foregoing operations S502 and S504 in the embodiment, the first node obtains the uplink/downlink division of the frame structure according to the common frame structure parameter and the first dedicated frame structure parameter configured by the second node, and determines, according to the second dedicated frame structure parameter, the frame structure for uplink transmission of the backhaul link and the frame structure for downlink transmission of the backhaul link, thereby solving the problem in the related art that the configuration of the frame structure may cause interference between nodes, and improving the data transmission efficiency in the IAB network.

In some exemplary implementations of the embodiment, the first node is an IAB node, and the second node is a Parent node (a Parent node of the first node).

It should be noted that the period of the frame structure involved in the embodiment is an integral multiple of the duration of a slot. The type of the frame structure includes an uplink (UL) frame structure, a downlink (DL) frame structure, and a flexible (Flexible, short as F) frame structure. The type of the frame structure in the second dedicated frame structure parameter involved in the embodiment includes at least one of the following: an uplink backhaul frame structure and a downlink backhaul frame structure.

In another exemplary implementation of the embodiment, each frame structure parameter may further include a transmission direction (namely, uplink or downlink) In a case where a lower-level node of the first node is the transmission node of the same type as the first node rather than a terminal (namely, the lower-level node of the IAB node is another IAB node), the transmission direction of the second dedicated frame structure parameter may be used to overwrite the transmission direction of the common frame structure parameter and the transmission direction of the first dedicated frame structure parameter.

Based on this, the method of the present embodiment may further include the following operations. The first node determines, according to a combination of the frame structure parameters, at least one of the following: a transmission time unit finally used for uplink/downlink within one period; a transmission time unit finally used for backhaul uplink transmission or backhaul downlink reception within one period; a potential position finally used by a current node (namely, the first node) to schedule an uplink time unit within one period, or a potential position that a current node finally uses to schedule a downlink time unit within one period.

The combination of frame structure parameters includes at least one of the following: a common frame structure parameter, a first dedicated frame structure parameter, and a second dedicated frame structure parameter; a common frame structure parameter and a second dedicated frame structure parameter; a first dedicated frame structure parameter and a second dedicated frame structure parameter.

It should be noted that in a case where the lower-level node of the first node is the transmission node of the same type as the first node rather than a user terminal, and a backhaul resource of the first node overlaps or partially overlaps with a backhaul resource of the lower-level transmission node, a transceiving state of the first node is opposite to a transceiving state of the lower-level transmission node. Herein, the transceiving state of the first node being opposite to the transceiving state of the lower-level transmission node refers to: when the first node executes a reception operation on the backhaul resource, the lower-level transmission node performs a transmission operation in a region in which the backhaul resource of the first node overlaps or partially overlaps with the backhaul resource of the lower-level node.

The specific implementation may be as follows. In a case where the lower-level node of the IAB node is also the IAB node, and the backhaul resource of the IAB node overlaps or partially overlaps with the backhaul resource of the lower-level IAB node, the transmission direction of the IAB node is opposite to the transmission direction of the lower-level IAB node. That is, when the IAB node performs the reception operation in the backhaul resource, the lower-level IAB node performs the transmission operation in a region in which the backhaul resource of the first node overlaps or partially overlaps with the backhaul resource of the lower-level node.

In a case where a lower-level node of the first node is a transmission node of the same type as the first node rather than a user terminal, and a backhaul resource of the first node does not overlap with a backhaul resource of the lower-level transmission node, a transceiving state of the first node is opposite to or the same as a transceiving state of the lower-level transmission node. That is, in a exemplary implementation, if the lower-level node of the IAB node is also an IAB node, and the resource of the IAB node does not overlap with the resource of the lower-level IAB node, the transmission direction of the IAB node and the transmission direction of the lower-level IAB node are opposite or the same.

In a case where a lower-level node of the first node is a user terminal, a frame structure configured by the first node for the lower-level transmission node is consistent with the frame structure of the first node. That is, the UL region of the first node cannot be configured as DL for the lower-level terminal node, and likewise, the DL region of the first node cannot be configured as UL for the lower-level terminal node.

In an exemplary implementation of the embodiment, the second dedicated frame structure parameter is formed by a combination of the common frame structure parameter and the first dedicated frame structure parameter; and/or the second dedicated frame structure parameter is a dynamic signaling Herein, the dynamic signaling is a frame structure configuration parameter carried by Downlink Control Information (DCI).

In some exemplary implementations of the embodiment, the common frame structure parameter involved in the embodiment is based on dual periods or a single period.

In an exemplary implementation of the embodiment, the first node configures a frame structure in at least one of the following manners (1)-(4).

Manner (1): the first node autonomously configures a frame structure of a lower-level node according to the common frame structure parameter and/or the first dedicated frame structure parameter and/or the second dedicated frame structure parameter.

Manner (2): a first node autonomously configures a frame structure of a lower-level node according to a first dedicated frame structure parameter and/or a dynamic frame structure parameter, wherein the dynamic frame structure parameter is configured via a Physical Downlink Control Channel (PDCCH).

Manner (3): a first node configures a frame structure of a lower-level node according to a common frame structure parameter, a first dedicated frame structure parameter and a dynamic frame structure parameter, wherein the configured frame structure includes an uplink (UL) frame structure, a downlink (DL) frame structure, a flexible frame structure, a backhaul UL frame structure, a backhaul DL frame structure, a backhaul multiplexing frame structure.

Manner (4): the first node autonomously configures a frame structure of a lower-level node according to the common frame structure parameter, the first dedicated frame structure parameter and/or a dynamic frame structure parameter, wherein the dynamic frame structure parameter is configured via a PDCCH.

In another exemplary implementation of the embodiment, power adjustment, which may be performed in the following manner 1 and manner 2, may also be involved in the embodiment.

Manner 1: a first node reports expected power adjustment to an upper-level node of the first node on a corresponding downlink backhaul transmission resource. Herein, the power adjustment includes one of the following: a received power adjustment value of a corresponding bandwidth, a transmitted power adjustment value of the corresponding bandwidth, an expected received power of the corresponding bandwidth, and an expected transmitted power of the corresponding bandwidth. The corresponding bandwidth is a bandwidth of one Resource Block (RB).

Manner 2: the first node indicates, for a lower-level node, power adjustment for a downlink backhaul transmission resource. Herein, a value of the power adjustment includes one of the following: a received power adjustment value of a corresponding bandwidth, a transmitted power adjustment value of the corresponding bandwidth, an expected received power of the corresponding bandwidth, and an expected transmitted power of the corresponding bandwidth; or the power adjustment is used for instructing the first node to indicate to the lower-level node whether to perform adjustment according to a required power adjustment value. The corresponding bandwidth is a bandwidth of one resource block RB.

In still another exemplary implementation of the embodiment, the method of the embodiment may further include the following operations S506 to S510.

In operation S506, the first node receives a power adjustment indication from an upper-level node, and multiplexes, according to the power adjustment indication, uplink transmission of a lower-level node of the first node on a corresponding resource.

In operation S508, the first node receives backhaul data transmitted by the upper-level node.

In operation S510, a first node schedules the lower-level node. Specifically, the first node schedules uplink backhaul transmission of the lower-level node in a region in which a backhaul resource of the first node overlaps or partially overlaps with a backhaul resource of the lower-level node.

The operations in the method of the embodiment are described from the perspective of the first node (IAB node). The method will be described below from the perspective of the second node (Parent node). It should be noted that the two description modes correspond to each other.

The present embodiment provides a configuration method for a frame structure from the perspective of a second node. The method includes the following operation S602. In operation S602, a second node configures frame structure parameters to a first node, wherein each frame structure parameter includes a period and a type of a frame structure, and the frame structure parameters include a common frame structure parameter, a first dedicated frame structure parameter and a second dedicated frame structure parameter. The common frame structure parameter and the first dedicated frame structure parameter are used for obtaining an uplink/downlink division of the frame structure, and the second dedicated frame structure parameter is used for determining the frame structure for uplink transmission of a backhaul link and the frame structure for downlink transmission of the backhaul link.

In some exemplary implementations of the embodiment, the period of the frame structure is an integer multiple of a duration of a slot. The type of the frame structure includes an uplink (UL) frame structure, a downlink (DL) frame structure, and a flexible frame structure. The type of the frame structure in the second dedicated frame structure parameter may include at least one of the following: an uplink backhaul frame structure, a downlink backhaul frame structure, and a flexible frame structure.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

The following describes the solution provided in Embodiment 1 in detail with reference to Embodiment 2 and Embodiment 5.

Embodiment 2

In the embodiment, ACCESS/BACKHAUL time division multiplexing, frequency division and space division multiplexing are involved. As shown in FIG. 1, the topology of the embodiment includes a Parent node, an IAB node, and a Child node. The Parent node is a Parent node of the IAB node. The IAB node transmits backhaul link data to the Parent node via a wireless link. The Child node is a lower-level link of the IAB node. The IAB node transmits backhaul link data or access link data to the Child node via a wireless link. Whether the link is an access link or a backhaul link depends on the type of the Child node. The IAB node can receive data transmitted by the Parent node and the Child node at the same time.

Figure 6:
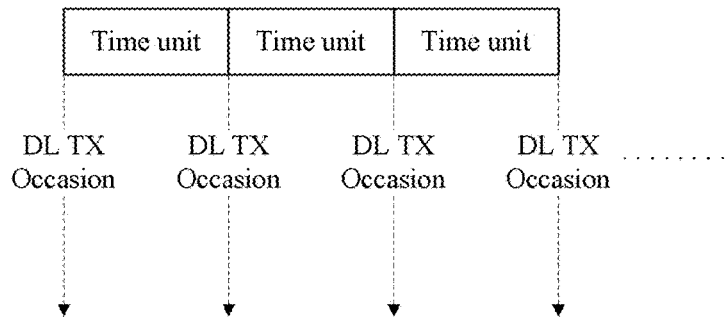
FIG. 6 is a schematic diagram of maintenance of timing between a Donor node and the networks of various levels of IAB nodes according to an embodiment of the present disclosure.

FIG. 6 is a schematic diagram of maintenance of timing between a Donor node and the networks of various levels of IAB nodes according to an embodiment of the present disclosure. As shown in FIG. 6, the Donor node and the networks of various levels of IAB nodes maintain a common absolute timing moment (within an error range). Such unified timing may be implemented by means of mechanisms such as OTA (Over The Air) or GPS (Global Positioning System). If these nodes transmit data to the Child node, the data needs to be transmitted by using the timing as a reference point, where this reference point is referred to as a downlink transmission time.

The Parent node configures a common frame structure parameter. The Parent node configures a first dedicated frame structure parameter for the IAB node, and configures a second dedicated frame structure parameter for the IAB node. The common frame structure parameter has the same configuration for all the served nodes. The first dedicated frame structure parameter indicates an additional frame structure and indicates these positions for uplink transmission or downlink reception. The uplink/downlink configuration of the frame structure of a node is basically defined, and for the IAB, the resources dedicated to the backhaul link transmission are configured by the second dedicated frame structure parameter.

An IAB node obtains a common frame structure parameter and a first dedicated frame structure parameter configured by a Parent node, and the IAB node obtains uplink/downlink division of a frame structure. The IAB node obtains a second dedicated frame structure parameter configured by the Parent node, the IAB node knows which of the uplink/downlink divisions is used for the uplink transmission of the backhaul link, and which of the uplink/downlink divisions is used for downlink reception of the backhaul link, that is, terminals, when performing data transceiving of the backhaul link, need to transmit and receive backhaul data according to the positions indicated by the second dedicated frame structure parameter. The IAB node may configure the frame structure parameters for the lower-level nodes at other uplink or downlink positions.

In some exemplary implementations of the embodiment, if the Parent node is a Donor node, the uplink and downlink ranges of the first dedicated frame structure parameter configured for the Child node may be extended to the Flexible range. For a Parent node which is not a Donor node, when configuring a frame structure for a lower-level node, uplink and downlink transmissions should follow the uplink and downlink transmission directions of this Parent node, that is, when configuring uplink and downlink for a lower-level node, a configuration with a transmission direction opposite to the transmission direction of the Parent node should not be provided. For example, the UL/F region of the current node cannot be configured as DL for the lower-level node, and the DL/F region of the current node cannot be configured as UL for the lower-level node.

The configured common frame structure parameter include: a period and a type of the configuration (frame structure). The period is an integral multiple of the duration of a slot. The type includes UL, DL, and Flexible. The duration is an integral multiple of a time corresponding to one or more Orthogonal Frequency Division Multiplexing (OFDM) symbols or an integral multiple of the duration of a slot. The common frame structure parameter is notified to the IAB nodes of the terminals under coverage through broadcast transmission, and is preferably carried in the form of a System information block (SIB). Alternatively, the common frame structure parameter follows the uplink/downlink division in an agreed manner. For example, a most basic uplink/downlink configuration as agreed is an uplink/downlink configuration with a period of P_ul_dl_default. In this uplink/downlink configuration, the front nSlot_DL slots starting from an even-numbered frame are configured as downlink. The period P_ul_dl_default is preferably an integer multiple of the length of a radio frame, and is, e.g., 20 ms, 40 ms and 80 ms. In this uplink/downlink configuration, the last nSlot_UL slots within the period P_ul_dl_default are configured as uplink, and the slots at the rest positions are configured as Flexible. The current node cannot assume any configuration for the positions indicated as Flexible, and determines the transmission direction at the positions according to subsequent semi-static configuration. Alternatively, these positions are reserved resources, i.e. these resources cannot finally have any assumption of transmission and reception operations.

In addition, in the embodiment, a relationship may be established between the agreed number of slots and a specific numerology. For example, if a reference numerology of the system is uRef and a current numerology of the system is uAct, the number of slots actually used for uplink and downlink transmission is adjusted to nSlot*2^(uAct−uRef).

The configured first dedicated frame structure parameter includes a period and a type of the configuration (namely, the period and type of the frame structure). The period is an integer multiple of the duration of a slot. The type includes UL, DL and Flexible. The duration is an integer multiple of a time corresponding to one or more OFDM symbols, or is an integer multiple of the duration of a slot. The first dedicated frame structure parameter is transmitted via high layer signaling, and the IAB node configures respective first dedicated configuration parameters (the first dedicated frame structure parameter) for the served lower-level IAB node or terminal. In practice, the first dedicated configuration parameter may be omitted, and the IAB node and the terminal interpret uplink/downlink division based on the common frame structure parameter only. If the common frame structure parameter is also missing, uplink/downlink division is interpreted according to the default mode.

The configured second dedicated frame structure parameter includes a period and a type of the configuration. The period is an integer multiple of the duration of a slot. The type includes UL, DL and Flexible. The duration is an integer multiple of a time corresponding to one or more OFDM symbols, or is an integer multiple of the duration of a slot. The second frame structure is configured via dedicated signaling, and is used for configuring the transmission and reception dedicated to the backhaul for the IAB.

Further, the type of the frame structure in the second dedicated frame structure parameter may be defined as downlink backhaul, Flexible and uplink backhaul. The transmission direction of the second dedicated frame structure parameter may overwrite the transmission direction of the common frame structure parameter and the first dedicated frame structure parameter when determining the final frame structure of the IAB node.

The IAB node determines the following contents according to the above frame structure configuration of the Parent node:
(1) A transmission time unit finally used for uplink and downlink within one period, for example, the duration of one or more slots or one or more OFDM symbols, or the duration of one or more slots plus one or more OFDM symbols;
(2) A transmission time unit finally used for backhaul uplink transmission or backhaul downlink reception within one period, for example, the duration of one or more slots or one or more OFDM symbols, or the duration of one or more slots plus one or more OFDM symbols;
(3) A potential position that a current node finally uses to schedule an uplink time unit within one period, for example, a position in the uplink time unit except the time unit for uplink backhaul reception; while a potential position that the current node uses to schedule a downlink time unit is, for example, a position in the uplink time unit except the time unit for downlink backhaul transmission, as shown by the potential config 1 of UE under IAB in FIG. 6; alternatively, a potential position that a current node finally uses to schedule an uplink time unit within one period is, for example, a position of a time unit used for downlink backhaul reception in the downlink time unit; while a potential position that a current node uses to schedule the downlink time unit is a position of a time unit used for uplink backhaul transmission in the uplink time unit, as shown by FIG. 7 which is a schematic diagram of Potential config of UE under IAB according to an embodiment of the present disclosure.

If the lower-level node of the IAB node is still an IAB node denoted as IAB node 2, the IAB node still needs to configure for the IAB node 2 a common frame structure parameter, one or more first dedicated frame structure parameters, or a default common frame structure parameter according to the above configuration process. The IAB node also configures a second dedicated frame structure parameter for the IAB node 2. The IAB node configures a DB (downlink backhaul) for the IAB node 2 in the downlink region of the IAB node, and configures a UB (uplink backhaul) for the IAB node 2 in the uplink region of the IAB node, as shown in the Potential config 1 in FIG. 7.

Figure 7:
FIG. 7 is a schematic diagram I of Potential config of UE under IAB according to an embodiment of the present disclosure.
Figure 7:
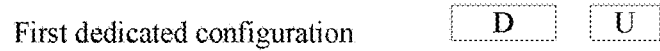
Figure 7:
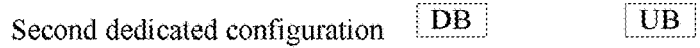
Figure 7:
Figure 7:
Figure 7:
Figure 7:
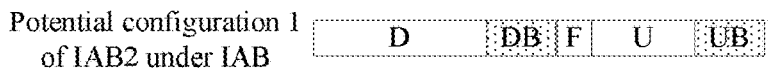
Figure 7:
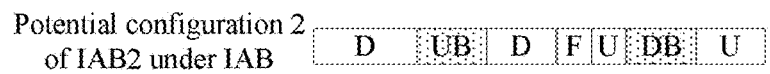

Further, the UB configured by the IAB node for the IAB node 2 is located in the downlink region of the frame structure of the IAB node, and the DB configured by the IAB node for the IAB node 2 is located in the uplink region of the frame structure of the corresponding IAB node, so that one node simultaneously receives data transmitted by an upper-level node and a lower-level node or one node simultaneously transmits data to the upper-level node and the lower-level node, as shown in the Potential config2 in FIG. 7.

Since the transmission timings of the upper-level node and the lower-level node are deviated, the two transmission operations cannot be performed at the same time. The IAB node may further configure the downlink backhaul for the IAB node 2 in the downlink region of the frame structure of the IAB node, and also configure the uplink backhaul in the downlink region of the frame structure of the IAB node, so that the same node can receive the data transmitted by the upper-level node and the lower-level node at the same time.

Figure 8:
FIG. 8 is a schematic diagram II of Potential config of IAB node according to an embodiment of the present disclosure.
Figure 8:

FIG. 8 is a schematic diagram II of Potential config of IAB node according to an embodiment of the present disclosure.

There is no inconsistency in the transmission direction between the common frame structure parameter and the first dedicated frame structure parameter configured for the frame structure. For example, a region configured as downlink in the common frame structure parameter cannot be configured as uplink in the first dedicated frame structure parameter, and a region configured as uplink in the common frame structure parameter cannot be configured as downlink in the first dedicated frame structure parameter.

Embodiment 3

In the present embodiment, no new frame structure signaling is introduced, and uplink and downlink common and dedicated configurations (frame structure configuration) are achieved by existing signaling. The topology of the present embodiment is as shown in FIG. 1, including a Parent node, an IAB node and a Child node. The Parent node is a Parent node of the IAB node. The IAB node transmits backhaul link data to the Parent node via a wireless link. The Child node is a lower-level link of the IAB node. The IAB node transmits backhaul link data or access link data to the Child node via a wireless link. Whether the link is an access link or a backhaul link depends on the type of the Child node. The IAB node can receive the data transmitted by the Parent node and the Child node at the same time.

As shown in FIG. 6, the Donor node and the networks of various levels of IAB nodes maintain a common absolute timing moment (within an error range). Such unified timing may be implemented by means of mechanisms such as OTA or GPS. If these nodes transmit data to the Child node, the data needs to be transmitted by using the timing as a reference point, where this reference point is referred to as a downlink transmission time.

The Parent node configures a common frame structure parameter. The Parent node configures a first dedicated frame structure parameter for the IAB node, and configures a second dedicated frame structure parameter for the IAB node. The common frame structure parameter has the same configuration for all the served nodes. The first dedicated frame structure parameter indicates an additional frame structure and indicates these positions for uplink transmission or downlink reception. The basic uplink/downlink configuration of the frame structure of a node is configured according to the common frame structure parameter and the first dedicated frame structure parameter, and for the IAB, the final configuration of the resources dedicated to backhaul link transmission is determined according to a combination of the second dedicated frame structure parameter and the common frame structure parameter, and/or the first dedicated frame structure parameter.

The configured common frame structure parameter includes a period and a type of the configuration. The period is an integer multiple of the duration of a slot. The type includes UL, DL and Flexible. The duration is an integer multiple of a time corresponding to one or more OFDM symbols, or is an integer multiple of the duration of a slot. The common frame structure parameter is notified to the IAB nodes of the terminals under coverage through broadcast transmission, and is preferably carried in the form of a SIB. Alternatively, the common frame structure parameter follows the uplink/downlink division in an agreed manner. For example, a most basic uplink/downlink configuration as agreed is an uplink/downlink configuration with a period of P_ul_dl_default. In this uplink/downlink configuration, the front nSlot_DL slots starting from an even-numbered frame are configured as downlink. The period P_ul_dl_default is preferably an integer multiple of the length of a radio frame, and is, e.g., 20 ms, 40 ms and 80 ms. In this uplink/downlink configuration, the last nSlot_UL slots within the period P_ul_dl_default are configured as uplink, and the slots at the rest positions are configured as Flexible. The current node cannot assume any configuration for the positions indicated as Flexible, and determines the transmission direction at the positions according to subsequent semi-static configuration. Alternatively, these positions are reserved resources, i.e. these resources cannot finally have any assumption of transmission and reception operations.

In addition, a relationship may be established between the agreed number of slots and a specific numerology. For example, if a reference numerology of the system is uRef and a current numerology is uAct, the number of slots actually used for uplink and downlink transmission is adjusted to nSlot*2^(uAct-uRef).

The configured first dedicated frame structure parameter includes a period and a type of the configuration. The period is an integer multiple of the duration of a slot. The type includes UL, DL and Flexible. The duration is an integer multiple of a time corresponding to one or more OFDM symbols, or is an integer multiple of the duration of a slot. The first dedicated frame structure parameter is transmitted via high-layer signaling, and the IAB node configures respective first dedicated configuration parameters for a lower-level IAB node or a terminal served thereby. In practice, the first dedicated frame structure parameter may be omitted, and the IAB node and the terminal interpret uplink/downlink division based on the common frame structure parameter only. If the common frame structure parameter is also missing, uplink/downlink division is interpreted according to the default mode.

The configured second dedicated frame structure parameter includes a period and a type of the configuration. The period is an integer multiple of the duration of a slot. The type includes UL, DL and Flexible. The duration is an integer multiple of a time corresponding to one or more OFDM symbols, or is an integer multiple of the duration of a slot. The second dedicated frame structure parameter is configured via dedicated signaling, and is used to configure the transmission and reception dedicated to the backhaul for the IAB.

Further, the type of the configuration of the second dedicated frame structure parameter may be defined as downlink backhaul, Flexible and uplink backhaul. The transmission direction of the second dedicated configuration (the second dedicated frame structure parameter) may overwrite the transmission direction of the common configuration and the first dedicated configuration (the common frame structure parameter and the first dedicated frame structure parameter) when determining the final frame structure of the IAB node.

The IAB node obtains a common frame structure parameter and a first dedicated frame structure parameter configured by the Parent node, and obtains uplink/downlink division of a frame structure. The IAB node obtains a second dedicated frame structure parameter configured by the Parent node, and obtains, according to a combination of the frame structure parameters, an uplink/downlink transmission region for an access link, an uplink/downlink transmission region for a backhaul link, an uplink/downlink transmission region for multiplexing of backhaul/access link, and a Flexible region.

The combination of the frame structure parameters includes at least one of the following: a common frame structure parameter and a first dedicated frame structure parameter; a common frame structure parameter, a first dedicated frame structure parameter, and a second dedicated frame structure parameter; a common frame structure parameter and a second dedicated frame structure parameter.

The IAB node obtains which configuration in the uplink/downlink division is used for the uplink transmission of the backhaul link, and which configuration in the uplink/downlink division is used for the downlink reception of the backhaul link, that is, the IAB node performs data reception and transmission of the backhaul link according to positions indicated by the combination of the frame structure parameters, and autonomously schedules the lower-level node of the IAB node in the access region. The combination of the frame structure parameters here is specific to the IAB node, and for a normal NR terminal, the frame structure configuration is interpreted in the original manner.

In some exemplary implementations of the embodiment, if the Parent node is a Donor node, the uplink and downlink ranges of the first frame structure parameter configured for the Child node may be extended to the Flexible range. For a Parent node which is not a Donor node, when configuring a frame structure for a lower-level node, uplink and downlink transmissions should follow the uplink and downlink transmission directions of this Parent node, that is, when configuring uplink and downlink for a lower-level node, a configuration with a transmission direction opposite to the transmission direction of the Parent node should not be provided. For example, the UL/F region of the current node cannot be configured as DL for the lower-level node, and the DL/F region of the current node cannot be configured as UL for the lower-level node.

Figure 9:
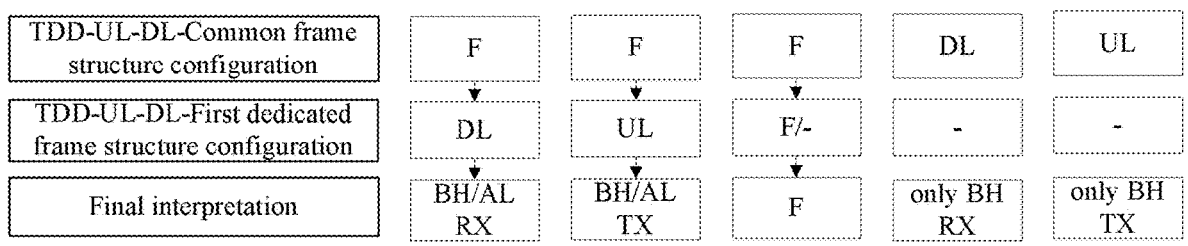
FIG. 9 is a schematic diagram I of combinations of different frame structure parameters according to an embodiment of the present disclosure.

FIG. 9 is a schematic diagram I of combinations of different frame structure parameters according to an embodiment of the present disclosure. As shown in FIG. 9, according to this configuration combination, a common frame structure parameter and a first dedicated frame structure parameter are configured for an LAB node by the Parent node, and a region which is configured as Flexible in the common frame structure parameter is configured as DL/UL/F/–again by a first frame structure, wherein "–" indicates that no additional configuration is performed for a corresponding region.

When a region in which the overlapping region is configured as Flexible is reconfigured as DL by the first dedicated frame structure configuration parameter, the IAB node interprets that the redefined overlapping region is a multiplexed reception region of the backhaul link and the access link, that is, the region can support receiving of the backhaul link, or receiving of the access link, or receiving of the two links at the same time.

When an overlapping region configured as a Flexible region is reconfigured as UL by the first dedicated frame structure parameter, the IAB node interprets that the overlapping region which is redefined is a multiplexed reception region of backhaul link and access link. Namely, in this region, uplink transmission of backhaul link or downlink transmission of access link may be performed, or two link transmission operations may be performed simultaneously. Due to transmission timing limitation, uplink transmission of backhaul link and downlink transmission of access link may be performed simultaneously. Herein, simultaneous transmission needs the satisfaction of a timing condition: the slot for the uplink transmission of the backhaul link is aligned with the slot for the downlink transmission of the access link, or the slot of the uplink transmission of the backhaul link is not aligned with the slot of the downlink transmission of the access link, but the two links differ by one or more OFDM symbols.

When an overlapping region configured as a Flexible region is reconfigured as Flexible/– by the first dedicated frame structure parameter, the IAB node interprets that the region is unknown to the current node, and the current node cannot assume that the region is used for transmission or reception at all.

When an overlapping region configured as a DL region is not additionally configured by the first dedicated frame structure parameter, the IAB node interprets that this region is a region dedicated to the downlink reception of the backhaul link of the IAB node.

When an overlapping region configured as a UL region is not additionally configured by the first dedicated frame structure parameter, the IAB node interprets that this region is a region dedicated to the uplink transmission of the backhaul link of the IAB node.

The combination of the different frame structure parameters may also be applied in the case where there is a plurality of transmission directions in one time unit. When different regions within a time unit are indicated as uplink and/or downlink and/or Flexible in an agreed mode or by the common frame structure parameter, and the first dedicated frame structure parameter indicates an uplink and/or downlink and/or Flexible in the same time unit or in different time units, each corresponding region in the overlapping regions may be handled by using the described rule.

The time unit may be at least one of the following: the duration of one radio frame; an integer multiple of the duration of one radio frame; the duration of one slot; an integer multiple of the duration of one slot; the duration of one or more symbols, the number of the symbols preferably being 2, 4, 6, 7; one or more aliquots of the duration of one radio frame.

Figure 10:
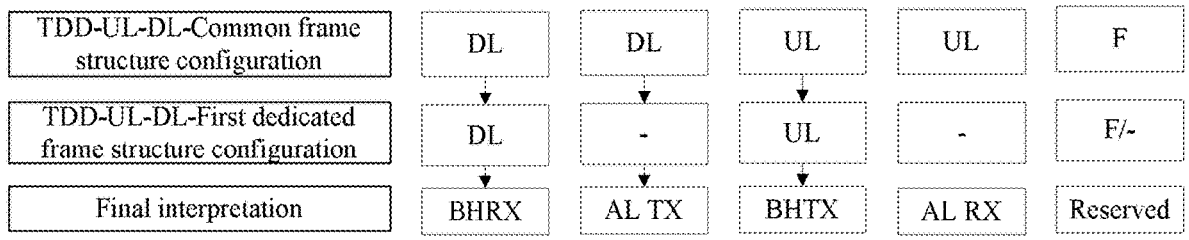
FIG. 10 is a schematic diagram II of combinations of different frame structure parameters according to an embodiment of the present disclosure.

FIG. 10 is a schematic diagram II of combinations of different frame structure parameters according to an embodiment of the present disclosure. As shown in FIG. 10, compared with the previous scheme, the configuration of the first dedicated frame structure parameter herein redefines the direction of DL/UL.

When an overlapping region, which is configured as a DL region by the common frame structure parameter or the agreed common frame structure parameter, is reconfigured as a DL region by the first dedicated frame structure parameter, the IAB node interprets that the redefined overlapping region is the reception region of the backhaul link, that is, reception of the backhaul link can be performed in this region.

When an overlapping region, which is configured as a DL region by the common frame structure parameter or the agreed common frame structure parameter, is not redefined by the first dedicated frame structure configuration parameter, the IAB node interprets that this region is for the downlink transmission of the access link, that is, the IAB node can transmit data to the lower-level node in this region.

When an overlapping region, which is configured as an UL region by the common frame structure parameter or the agreed common frame parameter, is reconfigured as UL by the first dedicated frame structure configuration parameter, the IAB node interprets that the redefined overlapping region is the transmission region of the backhaul link, that is, the IAB node can transmit data of the backhaul link in this region.

When an overlapping region, which is configured as an UL region by the common frame structure parameter or the agreed common frame structure parameter, is not indicated by the first dedicated frame structure configuration parameter, the IAB node interprets that the region is for uplink transmission of the access link, that is, the IAB node receives data from its immediate lower-level node in this region.

When an overlapping region, which is configured as an F region by the common frame structure parameter or the agreed common frame structure parameter, is not indicated by the first dedicated frame structure parameter or is indicated as F by the first dedicated frame structure parameter, the IAB node interprets that the region is a reserved region, that is, the IAB node cannot assume that data can be transmitted or received in the region.

According to the above frame structure configuration of the Parent node, the IAB node determines at least one of: (1) a transmission time unit finally used for uplink and downlink within one period; (2) a transmission time unit finally used for backhaul uplink transmission within one period; (3) a transmission time unit finally used for backhaul downlink reception within one period; (4) a potential position that a current node finally uses to schedule an uplink time unit within one period, for example, a time unit which is defined as UL by the first dedicated frame structure parameter, but is not additionally defined by the second dedicated frame structure parameter; while the potential position at which the current node schedules the downlink time unit is a time unit which is defined as DL by the first dedicated frame structure parameter but is not additionally defined by the second dedicated frame structure parameter, as shown in the situation of final interpretation in FIG. 10; (5) a potential position of a time unit that a current node finally uses to receive backhaul downlink and/or access uplink within one period, for example, a time unit which is defined as F by the first dedicated frame structure parameter but is additionally defined as DL by a second dedicated frame structure parameter; (6) a potential position of a time unit finally used by a current node to transmit the backhaul link and/or access link within one period, for example, a time unit which is defined as F by the first dedicated frame structure parameter but is additionally defined as UL by the second dedicated frame structure parameter. The time unit has the duration of one or more slots or one or more OFDM symbols, or the duration of one or more slots plus one or more OFDM symbols.

Embodiment 4

The topology of the embodiment is shown in FIG. 1, including a Parent node, an IAB node and a Child node. The Parent node is a Parent node of the IAB node. The IAB node transmits backhaul link data to the Parent node via a wireless link. The Child node is a lower-level link of the IAB node. The IAB node transmits backhaul link data or access link data to the Child node via a wireless link. Whether the link is an access link or a backhaul link depends on the type of the Child node. The IAB node can receive data transmitted by the Parent node and the Child node at the same time.

As shown in FIG. 6, the Donor node and the networks of various levels of IAB nodes maintain a common absolute timing moment (within an error range). Such unified timing may be implemented through mechanisms such as OTA or GPS. If these nodes transmit data to the Child node, the data needs to be transmitted by using the timing as a reference point, where this reference point is referred to as a downlink transmission time.

An upper-level node configures a time-domain unit for backhaul link transmission and reception for a lower-level node. The upper-level node may be a Donor node or an IAB, and the lower-level node may be an IAB node. In the embodiment, the upper-level node is denoted as a Father node, the lower-level node is denoted as an IAB node, and the lower-level node of the IAB node is denoted as a Child node.

The IAB node measures the received power of the signal transmitted by the Father node, and the IAB node measures the received signal power transmitted by the Child node.

The signal measured by an IAB node and transmitted by a Father node includes at least one of the following: a synchronous broadcast block (SSB); a pilot for channel measurement (e.g., CSI-RS); RS for phase tracking (e.g., PTRS); Physical Control Channel (e.g., PDCCH); Physical Shared Channel (e.g., PDSCH); DMRS for demodulating a control channel (DeModulation Reference Signal, e.g., PDCCH DMRS); DMRS for demodulating a physical broadcast channel (e.g., PBCH DMRS); DMRS for demodulating a physical shared channel (e.g., PDSCH DMRS). The signal measured by the IAB node and transmitted by the Child node includes at least one of the following: a PUCCH; a PUSCH; a PUSCH DMRS; a PUCCH DMRS.

A channel or a pilot transmitted by the described Father node and Child node, if not specifically described, is uniformly referred to as a signal or a channel in the subsequent description.

The IAB node measures the received power of a signal or channel transmitted by the Father node, and the IAB node measures the received power of a signal or channel transmitted by the Child node. The IAB node calculates the power difference between the signals or channels, and this power difference is denoted as power-offset.

Alternatively, the IAB node measures the received power of a signal or channel transmitted by the Child node, and the IAB node denotes the received power as received-power-expected.

Further, the IAB node measures a signal or channel transmitted by the Father node, and measures the path loss which is denoted as PL_downlink. The IAB node calculates the expected transmitted power of the Father node as tx-power-expected=received-power-expected+PL_downlink.

For a TDD system, the IAB node is configured to receive two of the following parameters: a first frame structure parameter; a second frame structure parameter; a third frame structure parameter.

The first frame structure parameter may be a common frame structure parameter configured by the Parent node through broadcasting (for example, SIB), or an agreed common frame structure parameter. The second frame structure parameter is a dedicated frame structure parameter configured by the Parent node via dedicated signaling (e.g., RRC signaling). The third frame structure parameter is a dedicated frame structure parameter notified via dedicated signaling (such as RRC signaling), and this dedicated signaling is dedicated for notifying the time-domain resource division of the backhaul link.

If the first frame structure parameter is configured to the IAB node through the Parent node, the common frame structure parameter provides the same configuration for all the served nodes. The second frame structure parameter indicates an additional frame structure, and indicates, in combination with the first frame structure parameter, the region used for uplink transmission or downlink reception. As for the transmission resources used for the backhaul link, the IAB determines final transmission resources according to a combination result of the third frame structure parameter, the first frame structure parameter and/or the second frame structure parameter.

Figure 11:
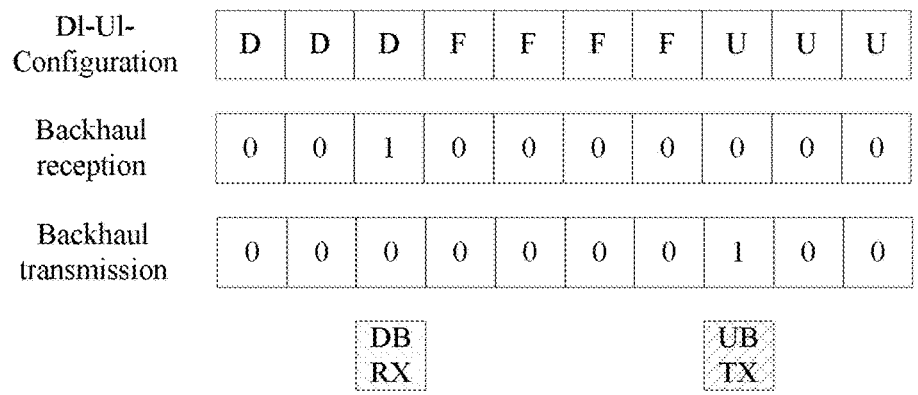
FIG. 11 is a schematic diagram illustrating the notification of a third frame structure parameter in a form of bit-map according to an embodiment of the present disclosure.

The third frame structure parameter may be notified in the form of bit-map, as shown in FIG. 11. FIG. 11 is a schematic diagram illustrating the notification of a third frame structure parameter in a form of bit-map according to an embodiment of the present disclosure. The downlink reception and the uplink transmission respectively correspond to one bit-map. The configuration signaling for the backhaul downlink reception corresponds to a field bit-map-backhaul-RX. The number of bits contained in the bit-map-backhaul-RX is the number of slots in one uplink/downlink configuration for a TDD system. For an FDD (Frequency Division Duplexing) system, if an RRC (Radio Resource Control) signaling is not updated, the IAB applies the configuration to subsequent slots with the number of current configured slots as a period. A slot corresponding to the bit value of 1 corresponds to a backhaul RX. The configuration signaling corresponding to uplink backhaul transmission corresponds to a field bit-map-backhaul-TX. The number of bits contained in the bit-map-backhaul-TX is the number of slots in an uplink/downlink configuration. With regard to a TDD system, this number is the number of slots in an uplink/downlink configuration; while with regard to an FDD system, if the RRC signaling is not updated, then an IAB applies this configuration to subsequent slots with the number of slots of the current configuration as a period.

For the IAB node, after receiving backhaul RX (downlink backhaul, DB) and UB TX (uplink backhaul, UB) related to the IAB node, the IAB node reports the aforementioned calculated power offset in the time unit corresponding to the backhaul link. The Parent node receives the content reported by the IAB node and sends a power adjustment notification.

With regard to the upper-level node, i.e., the Parent node which receives the power report, the Parent node can perform adjustment according to the expected power reported by the IAB node, or the Parent node can ignore the power information reported by the IAB node according to the scheduling condition of the Parent node, or the Parent node performs power adjustment according to the reporting of the IAB node, and notifies the IAB of the power adjustment solution via a signaling.

A manner for power adjustment is described as follows. The IAB node may assume that the Parent node will perform power adjustment according to the expected power reported by the IAB node, and the IAB node will not transmit an acknowledgement message to the IAB node. The IAB node will measure the power on a DB link after transmitting the expected power. When the IAB node measures that the power on the DB link is consistent with the expected power reported by the IAB node, the IAB node may perform link multiplexing of the DB and a UA (uplink access), in which the UA is an uplink transmission link corresponding to a lower-level node of a terminal type served by the IAB node, and corresponds to a reception operation of the IAB node. Alternatively, the IAB node may perform link multiplexing of DB and UB (uplink backhaul), wherein the UB is an uplink transmission link corresponding to a lower-level node of an IAB type served by the IAB node, and corresponds to a reception operation of the IAB node.

The manner adopted for power indication may include: indicating a transmitted power value of a DB link according to a certain time unit as a granularity, or indicating a received power of the DB link for an IAB node according to a certain time unit as a granularity, or indicating an offset value of the transmitted power of the DB link according to a certain time unit as a granularity.

The time length of the certain time unit may be the duration of one or more OFDM symbols, or the duration of one or more slots. A preferred power adjustment is based on one slot as the granularity of the time unit.

Figure 12:
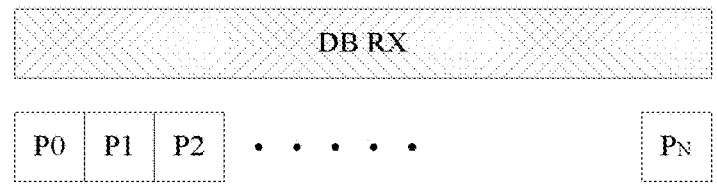
FIG. 12 is a schematic diagram of power adjustment according to an embodiment of the present disclosure.

The IAB node feeds back an expected power adjustment value, and the power adjustment value determined by the Parent node is a transmitted power pattern on a corresponding DB time unit, as shown in FIG. 12 which is a schematic diagram of power adjustment according to an embodiment of the present disclosure.

For the power adjustment value, the feedback mechanism adopted by the IAB node includes: the IAB node feeds back an expected power adjustment value; the IAB node feeds back an expected received power; the IAB node feeds back an expected transmitted power.

For the power adjustment value, if the IAB node feeds back an expected power adjustment offset value, the Parent node performs corresponding power adjustment according to the offset value fed back by the IAB node. For example, if the expected power offset value fed back by the IAB node is [p-offset1, p-offset2, p-offset3, ... , p-offsetN] according to a certain time granularity, the Parent node notifies the IAB node of the corresponding power adjustment value [p-offset1',p-offset2',p-offset3", ... , p-offsetN'] according to the same time granularity, or the Parent node notifies the IAB node of the corresponding power adjustment value according to another time granularity, or the Parent node transmits only one bit of information to indicate whether to perform power adjustment according to the expected power offset reported by the IAB node, for example, "1" represents a positive response, that is, the IAB node receives the message considers that the received power level of the subsequent DB link is the expected power level; and "0" indicates a negative response, i.e., the IAB node cannot assume whether the received power level of the subsequent DB link is an expected power level.

With regard to the power offset value, the IAB node measures a difference value between the received power of the DB and the received power of the data transmitted by the lower-level node on the UB link, i.e. p_offset=p_DB−p_UB. Alternatively, the IAB node measures a difference between the received power of the DB and the data transmitted by the next-level terminal node on the UA link, that is, p-offset=p-DB−p-UA.

For the expected received power, the IAB node reports the downlink path loss PL_downlink, and the Parent node adjusts the power to: tx_pwr=received-power-expected+ PL_ downlink.

The Parent node notifies the power to be adjusted to the IAB node, and notifies the expected received power or transmitted power of the corresponding time-domain unit according to the granularity of a certain time-domain unit (the situation as described in FIG. 12), or provides a positive or negative response to the IAB node, that is, the transmitted power is adjusted to the expected received power of the IAB node according to the request of the IAB node in the corresponding time-domain unit.

If the content reported by the IAB node is the expected transmitted power, the IAB node measures the received power of the SSB transmitted by the Parent node, and measures the path loss of the DB link, which is denoted as PL_DB; the IAB node measures the received power (which is denoted as p_UA or P_UB) of the data transmitted by the lower-level node to the IAB node, and the power offset between the P_UA or P_UB and the P_DB is p_offset; and the expected transmitted power of the Parent node is calculated as p_tx_expected=p_DB+PL_downlink-p_offset. Alternatively, the Parent node notifies the IAB node of the transmitted power (which is denoted as p_tx) of a certain signal or channel in downlink, and the IAB estimates the expected transmitted power of the Parent node as p_tx_expected=p_tx-p_offset according to the power offset. Alternatively, the power of a specific signal or channel notified by the IAB node has a power offset relative to a transmission control and service channel of the DB link, and this power offset is denoted as p_offset_diff_signal=p_DL_ref_tx-p_DL_ctrl_tx, or p_offset_diff_signal=p_DL_ref_tx-p_DL_data_tx.

In the above formulae, p_DL_ref_tx is a signal or channel used as power adjustment, including the following: a downlink synchronization signal broadcast block (e.g., an SSB); a demodulation reference signal of physical broadcast channel (e.g., PBCH DMRS); a channel state measurement signal (e.g., CSI-RS); a phase tracking reference signal (e.g., PTRS).

In this situation, the expected transmitted power is p_tx_expected=p_tx−p_offset+p_offset_diff_signal, where p_offset_diff_signal is a power offset between a measurement signal or channel and a receiving signal or channel, and this power offset may be configured to the IAB node through broadcast or unicast or dedicated signaling between the IAB nodes or network management background, or may be an agreed power offset between the measurement signal or channel and the receiving signal or channel.

For a TDD system, the IAB node obtains the first frame structure parameter configured by the Parent node, and the IAB node obtains uplink/downlink division of the frame structure. The IAB node obtains the second frame structure parameter configured by the Parent node, and the IAB node obtains additional uplink/downlink division for the IAB node.

The IAB node finally determines, according to the third frame structure parameter, at least one or a combination of a plurality of the following: a time-domain unit division for downlink receiving of a backhaul link; a time-domain unit division for uplink receiving of a backhaul link; a time-domain unit division for downlink transmission of an access link; a time-domain unit division for uplink receiving of an access link; a time-domain unit division for downlink data receiving of a backhaul link and also for uplink data receiving of an access link; a time-domain unit division not used for transmission or reception; a time-domain unit division used for uplink data transmission of a backhaul link and also used for downlink data transmission of an access link.

In some exemplary implementations of the embodiment, if the Parent node is a Donor node, the uplink and downlink ranges of the second frame structure parameter configured for the Child node may be extended to the range configured as Flexible by the first frame structure parameter. For a Parent node which is not a Donor node, when configuring a frame structure for a lower-level node, uplink and downlink transmission should follow the uplink and downlink transmission directions of this Parent node, that is, when configuring uplink and downlink for a lower-level node, a configuration with a transmission direction opposite to the transmission direction of the Parent node should not be provided. For example, the UL/F region of the current node cannot be configured as DL for the lower-level node, and the DL/F region of the current node cannot be configured as UL for the lower-level node.

The first frame structure parameter includes a period and a type of the configuration. The period is an integer multiple of a duration of a slot. The type includes UL, DL and Flexible. The duration is an integer multiple of a time corresponding to one or more OFDM symbols or a duration of a slot. The first frame structure parameter is a common frame structure parameter, and the common frame structure parameter is notified to an IAB node of a terminal under coverage through broadcast transmission, and is preferably carried in the form of an SIB. Alternatively, the common frame structure parameter follows the uplink/downlink division in an agreed manner. For example, a most basic uplink/downlink configuration as agreed is an uplink/downlink configuration with a period of P_ul_dl_default. In this uplink/downlink configuration, the front nSlot_DL slots starting from an even-numbered frame are configured as downlink. The period P_ul_dl_default is preferably an integer multiple of the length of a radio frame, and is, e.g., 20 ms, 40 ms and 80 ms. In this uplink/downlink configuration, the last nSlot_UL slots within the period P_ul_dl_default are configured as uplink, and the slots at the rest positions are configured as Flexible. The current node cannot assume any configuration for the positions indicated as Flexible, and determines the transmission direction at the positions according to subsequent semi-static configuration. Alternatively, these positions are reserved resources, i.e. these resources cannot finally have any assumption of transmission and reception operations.

In addition, in the embodiment, a relationship may be established between the agreed number of slots and a specific numerology. For example, if a reference numerology of the system is uRef and a current numerology of the system is uAct, the number of slots actually used for uplink and downlink transmission is adjusted to nSlot*2^(uAct−uRef).

The second frame structure parameter includes a period and a type of the configuration. The period is an integer multiple of a duration of a slot. The type includes UL, DL and Flexible. The duration is an integer multiple of a time corresponding to one or more OFDM symbols or a duration of a slot. The second frame structure parameter is a first dedicated frame structure parameter, and the first dedicated frame structure parameter is transmitted via high-layer signaling. The IAB node configures respective first dedicated configuration parameters for the served lower-level IAB node or terminal. In practice, the first dedicated configuration parameter may be omitted. In this case, the IAB node and the terminal interpret uplink/downlink division only based on a common frame structure configuration parameter (a common frame structure parameter). If the common frame structure configuration parameter is also missing, uplink/downlink division is interpreted in the default mode.

The third frame structure parameter includes a period and a type of the configuration. The period is an integer multiple of a duration of a slot. The type includes UL, DL and Flexible. The duration is an integer multiple of a time corresponding to one or more OFDM symbols or a duration of a slot. The third frame structure parameter is a second dedicated frame structure parameter, which can be configured via dedicated signaling, and is used for configuring the transmission and reception dedicated to the backhaul for the IAB.

Further, the type of the third frame structure configuration parameter may be defined as downlink backhaul, Flexible and uplink backhaul. Furthermore, the transmission direction of the third frame structure configuration parameter of the IAB node may be used for rewriting the transmission direction of the first frame structure configuration parameter and/or the second frame structure configuration parameter when determining the final frame structure of the IAB node.

The IAB node determines at least one of the following contents according to the above frame structure configuration of the Parent node: (1) a transmission time unit finally used for uplink and downlink within one period; (2) a transmission time unit finally used for backhaul uplink transmission or backhaul downlink reception within one period; (3) a potential time unit finally used for the current node to schedule uplink transmission of the access link within one period, wherein the uplink transmission of the access link is an operation that the current node schedules a served node (including an ordinary terminal and an IAB node) to perform uplink data transmission, and this operation is scheduled and controlled by an upper-level node, as shown in the topology in FIG. 1, the uplink transmission of the Child node is scheduled by the IAB node. The time unit for uplink transmission of the access link is a position except the time unit for uplink backhaul transmission in the uplink time unit; while the potential time unit for the current node to schedule downlink transmission of the access link is a position in the downlink time unit other than the time unit for downlink reception of the backhaul link, as shown in the situation of the Physical config 1 of UE under IAB in FIG. 7; or a potential position finally used by the current node to schedule the uplink time unit within one period, for example, a part of or the entire time unit used for downlink backhaul reception in the downlink time unit; while the potential position used for the current node to schedule the downlink time unit by a current node is a part of or the entire time unit for uplink backhaul transmission in the uplink time unit, as shown in the Potential config2 of UE under IB in FIG. 7.

If the lower-level node of the IAB node is still an IAB node denoted as IAB node 2, the IAB node still configures one or more of the first frame structure parameter, the second frame structure parameter and the third frame structure parameter, or configures a default common frame structure parameter according to the above configuration process. The first frame structure parameter is a common frame structure parameter, the second frame structure parameter is a first dedicated frame structure parameter, which is preferably transmitted by means of RRC signaling, and the third frame structure parameter is a second dedicated frame structure parameter, which is preferably configured by means of dynamic signaling. The IAB node configures a DB for the IAB node 2 in the downlink region of the IAB node, and configures a UB for the IAB node 2 in the uplink region of the IAB node, as shown in the situation of the Potential config 1 of IAB2 under IAB in FIG. 7.

Further, the UB configured by the IAB node for the IAB node 2 is located in the downlink region of the frame structure of the IAB node, and the DB configured by the IAB node for the IAB node 2 is located in the uplink region of the frame structure of the corresponding IAB node. In this way, one node can simultaneously receive data transmitted by an upper-level node and a lower-level node, or one node can simultaneously transmit data to an upper-level node and a lower-level node, as shown in the situation represented by the Potential config2 of IAB2 under IAB in FIG. 7. The difference between the Potential config2 of IAB2 under IAB and the Potential config1 of IAB2 under IAB lies in that, according to config2 the reception of the lower-level node and the reception of the upper-level node can be performed at the same time in, for example, FDM (Frequency Division Multiplexing) or SDM (Space Division Multiplexing) mode, while according to config1, for the transmission to the lower-level node, the IAB node needs to select a region without backhaul reception in the downlink region of the IAB node and configure this selected region as the downlink frame structure of the lower-level node.

Since the transmission timings of the upper-level node and the lower-level node are deviated, the two transmission operations cannot be performed at the same time. The IAB node may further configure the downlink backhaul for the IAB node 2 in the downlink region of the frame structure of the IAB node, and also configure the uplink backhaul in the downlink region of the frame structure of the IAB node, so that the same node can receive the data transmitted by the upper-level node and the lower-level node at the same time. FIG. 8 shows a case of Potential config 3 of IAB node 2.

The length of the time unit has the duration of one or more slots or one or more OFDM symbols, or the duration of one or more slots plus the duration of one or more OFDM symbols.

When the IAB node transmits in an expected transmitted power, an expected power adjustment value or an expected received power to the Parent node, assuming that the Parent node performs power adjustment according to the IAB node and the Parent node, or the Parent node notifies the IAB of an adjustment value of the transmitted power according to a certain time-domain granularity, or the Parent node notifies, according to the expected received power value reported by the IAB node and based on a certain time granularity, a received power adjustment value for the IAB node. The IAB node receives, in frequency division multiplexing (FDM) or space division multiplexing (SDM), uplink data transmitted by an upper-level node and downlink data transmitted by a lower-level node, so that the spectrum utilization rate is improved by means of multiplexing.

For an FDD system, the IAB node is configured to receive the third frame structure parameter. Parameters related to uplink/downlink configuration are applied to the TDD system. For the FDD system, the uplink and downlink configurations are separately configured, uplink/downlink configurations do not need to be provided for an IAB node, and only a third frame structure parameter is required to separately indicate a time unit dedicated for the IAB node to transmit a backhaul.

The inconsistency of transmission directions will not occur in the first frame structure parameter and the second frame structure parameter configured for the frame structure. For example, a region configured as downlink by the common frame structure parameter cannot be configured as uplink by the second frame structure parameter, and a region configured as uplink by the common frame structure parameter cannot be configured as downlink by the second frame structure parameter.

The uplink/downlink configuration of an IAB node will serve as a basis for the configuration of a lower-level node. If the lower-level node is an ordinary terminal, the configuration of the third frame structure cannot conflict with the configuration of the previous two frame structures. If the lower-level node is an IAB node, the third frame structure can be configured with different transmission directions, for example, the case of Potential config2 of IAB2 under IAB in FIG. 7.

Embodiment 5

The topology of the embodiment is shown in FIG. 1, including a Parent node, an IAB node and a Child node. The Parent node is a Parent node of the IAB node. The IAB node transmits the backhaul link data to the Parent node via a wireless link. The Child node is a lower-level link of the IAB node. The IAB node transmits backhaul link data or access link data to the Child node via a wireless link. Whether the link is an access link or a backhaul link depends on the type of the Child node. The IAB node can receive data transmitted by the Parent node and the Child node at the same time.

As shown in FIG. 6, the Donor node and the networks of various levels of IAB nodes maintain a common absolute timing moment (within an error range). Such unified timing may be implemented by means of mechanisms such as OTA or GPS. If these nodes transmit data to the Child node, the data needs to be transmitted by using the timing as a reference point, where this reference point is referred to as a downlink transmission time.

The IAB node is configured to receive two of the following parameters: a first frame structure parameter; a second frame structure parameter; and a third frame structure parameter.

The first frame structure parameter may be a common frame structure parameter configured by the Parent node for the IAB node through broadcasting (such as SIB), or an agreed common frame structure parameter. The second frame structure parameter is a first dedicated frame structure parameter configured by the Parent node via dedicated signaling (RRC signaling) The third frame structure parameter is a second dedicated frame structure parameter notified dynamically by the Parent node through dynamic signaling such as DCI 2-0.

If the first frame structure parameter is configured to the IAB node through the Parent node, the common frame structure parameter provides the same configuration for all served nodes. The second frame structure parameter indicates an additional frame structure, and indicates, in combination with the first frame structure parameter, the region used for uplink transmission or downlink reception. For the IAB, the final transmission resources for the backhaul link and the access link are determined through a combination result of the third frame structure parameter, the first frame structure parameter and/or the second frame structure parameter.

The IAB node obtains a first frame structure parameter configured by a Parent node, and the IAB node obtains uplink/downlink division of a frame structure. The IAB node obtains a second frame structure parameter configured by the Parent node, and the IAB node obtains additional uplink/downlink division for the IAB node.

The IAB node finally determines, according to the third frame structure parameter, at least one or a combination of a plurality of the following: a time-domain unit division for downlink receiving of a backhaul link; a time-domain unit division for uplink receiving of a backhaul link; a time-domain unit division for uplink receiving of an access link; a time-domain unit division for downlink transmission and reception of an access link; a time-domain unit division for downlink data reception of a backhaul link and also for uplink data reception of an access link; a time-domain unit division not used for transmission or reception; a time-domain unit division for uplink data transmission of the backhaul link and also for downlink transmission of the access link.

In some exemplary implementations of the embodiment, if the Parent node is a Donor node, the uplink and downlink ranges of the second frame structure parameter configured for the Child node may be extended to the range configured as Flexible by the first frame structure parameter. For a Parent node which is not a Donor node, when configuring a frame structure of a lower-level node, uplink and downlink transmission should follow the uplink and downlink transmission directions of this Parent node, that is, when configuring the uplink and downlink of the lower-level node, a configuration with a transmission direction opposite to the transmission direction of the Parent node should not be provided. For example, the UL/F region of the current node cannot be configured as DL for the lower-level node, and the DL/F region of the current node cannot be configured as UL for the lower-level node.

The first frame structure configuration parameter includes: a period and a type of the configuration. The period is an integer multiple of a duration of a slot. The type includes UL, DL and Flexible. The duration is an integer multiple of a time corresponding to one or more OFDM symbols or a duration of a slot. The common frame structure configuration parameter may be notified to the IAB node of the terminal under coverage through broadcast transmission, and is preferably carried in the form of SIB. Alternatively, the common frame structure parameter follows the uplink/downlink division in an agreed manner. For example, a most basic uplink/downlink configuration as agreed is an uplink/downlink configuration with a period of P_ul_dl_default. In this uplink/downlink configuration, the front nSlot_DL slots starting from an even-numbered frame are configured as downlink. The period P_ul_dl_default is preferably an integer multiple of the length of a radio frame, and is, e.g., 20 ms, 40 ms and 80 ms. In this uplink/downlink configuration, the last nSlot_UL slots within the period P_ul_dl_default are configured as uplink, and the slots at the rest positions are configured as Flexible. The current node cannot assume any configuration for the positions indicated as Flexible, and determines the transmission direction at the positions according to subsequent semi-static configuration. Alternatively, these positions are reserved resources, i.e. these resources cannot finally have any assumption of transmission and reception operations.

In addition, in the embodiment, a relationship may be established between the agreed number of slots and a specific numerology. For example, if a reference numerology of the system is uRef and a current numerology of the system is uAct, the number of slots actually used for uplink and downlink transmission is adjusted to nSlot*2^(uAct−uRef).

The first frame structure parameter includes a period and a type of the configuration. The period is an integer multiple of a duration of a slot. The type includes UL, DL and Flexible. The duration is an integer multiple of a time corresponding to one or more OFDM symbols or a duration of a slot. The first dedicated frame structure parameter is transmitted via high-layer signaling. The IAB node configures respective first dedicated configuration parameters for the served lower-level IAB node or terminal. In practice, the first dedicated configuration parameter may be omitted. In this case, the IAB node and the terminal interpret uplink/downlink division only based on a common frame structure configuration parameter (a common frame structure parameter). If the common frame structure configuration parameter is also missing, uplink/downlink division is interpreted in the default mode.

The second frame structure configuration parameter includes: a period and a type of the configuration. The period is an integer multiple of a duration of a slot. The type includes UL, DL and Flexible. The duration is an integer multiple of a time corresponding to one or more OFDM symbols or a duration of a slot. The second frame structure is configured via dedicated signaling, and is used for configuring the transmission and reception dedicated to the backhaul for the IAB.

Further, the type of the third frame structure configuration parameter may be defined as downlink backhaul, Flexible and uplink backhaul. Furthermore, the transmission direction of the third frame structure configuration parameter of the IAB node may be used for rewriting the transmission direction of the first frame structure configuration parameter and/or the second frame structure configuration parameter when determining the final frame structure of the IAB node.

The IAB node determines at least one of the following contents according to the above frame structure configuration of the Parent node: (1) a transmission time unit finally used for uplink and downlink within one period; (2) a transmission time unit finally used for backhaul uplink transmission or backhaul downlink reception within one period; (3) a potential time unit finally used for the current node to schedule uplink transmission of the access link within one period, wherein the uplink transmission of the access link is an operation that the current node schedules a served node (including an ordinary terminal and an IAB node) to perform uplink data transmission, and this operation is scheduled and controlled by an upper-level node, as shown in the topology in FIG. 1, the uplink transmission of the Child node is scheduled by the IAB node. The time unit for uplink transmission of the access link is a position except the time unit for uplink backhaul transmission in the uplink time unit; while the potential time unit for the current node to schedule downlink transmission of the access link is a position in the downlink time unit other than the time unit for downlink reception of the backhaul link, as shown in the situation of the Physical config 1 of UE under IAB in FIG. 7; or a potential position finally used by the current node to schedule the uplink time unit within one period, for example, a part of or the entire time unit used for downlink backhaul reception in the downlink time unit; while the potential position used for the current node to schedule the downlink time unit by a current node is a part of or the entire time unit for uplink backhaul transmission in the uplink time unit, as shown in the Potential config2 of UE under IB in FIG. 7.

If the lower-level node of the IAB node is still an IAB node denoted as IAB node 2, the IAB node still configures one or more of the first frame structure parameter, the second frame structure parameter and the third frame structure parameter, or configures a default common frame structure parameter according to the above configuration process. The first frame structure parameter is a common frame structure parameter, the second frame structure parameter is a first dedicated frame structure parameter, which is preferably transmitted by means of RRC signaling, and the third frame structure parameter is a second dedicated frame structure parameter, which is preferably configured by means of dynamic signaling. The IAB node configures a DB for the IAB node 2 in the downlink region of the IAB node, and configures a UB for the IAB node 2 in the uplink region of the IAB node, as shown in the situation of the Potential config 1 of IAB2 under IAB in FIG. 7.

Further, the UB configured by the IAB node for the IAB node 2 is located in the downlink region of the frame structure of the IAB node, and the DB configured by the IAB node for the IAB node 2 is located in the uplink region of the frame structure of the corresponding IAB node. In this way, one node can simultaneously receive data transmitted by an upper-level node and a lower-level node, or one node can simultaneously transmit data to an upper-level node and a lower-level node, as shown in the situation represented by the Potential config2 of IAB2 under IAB in FIG. 7. The difference between the Potential config2 of IAB2 under IAB and the Potential config1 of IAB2 under IAB lies in that, according to config2 the reception of the lower-level node and the reception of the upper-level node can be performed at the same time in, for example, FDM (Frequency Division Multiplexing) or SDM (Space Division Multiplexing) mode, while according to config1, for the transmission to the lower-level node, the IAB node needs to select a region without backhaul reception in the downlink region of the IAB node and configure this selected region as the downlink frame structure of the lower-level node.

Since the transmission timings of the upper-level node and the lower-level node are deviated, the two transmission operations cannot be performed at the same time. The IAB node may further configure the downlink backhaul for the IAB node 2 in the downlink region of the frame structure of the IAB node, and also configure the uplink backhaul in the downlink region of the frame structure of the IAB node, so that the same node can receive the data transmitted by the upper-level node and the lower-level node at the same time. FIG. 8 shows a case of Potential config3 of IAB node2.

The length of the time unit has the duration of one or more slots or one or more OFDM symbols, or the duration of one or more slots plus the duration of one or more OFDM symbols.

The inconsistency of transmission directions will not occur in the first frame structure parameter and the second frame structure parameter configured for the frame structure. For example, a region configured as downlink by the common frame structure parameter cannot be configured as uplink by the second frame structure parameter, and a region configured as uplink by the common frame structure parameter cannot be configured as downlink by the second frame structure parameter.

The uplink/downlink configuration of an IAB node will serve as a basis for the configuration of a lower-level node. If the lower-level node is an ordinary terminal, the configuration of the third frame structure cannot conflict with the configuration of the previous two frame structures. If the lower-level node is an IAB node, the third frame structure can be configured with different transmission directions, for example, the case of Potential config2 of IAB2 under IAB in FIG. 7.

Embodiment 6

The present embodiment provides a configuration apparatus for a frame structure. The apparatus is used to implement the above embodiments and exemplary implementations, and the details having been described will not be repeated. As used below, the term "module" may implement a combination of software and/or hardware of a predetermined function. Although the apparatus described in the following embodiments is preferably implemented in software, the implementation in hardware or a combination of software and hardware is also possible and contemplated.

Figure 13:
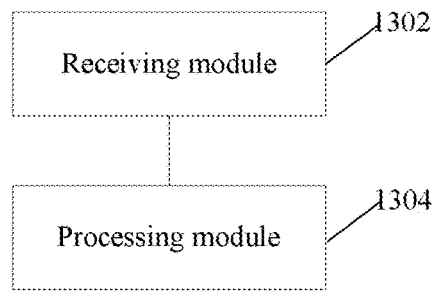
FIG. 13 is a schematic structural diagram of a configuration apparatus for a frame structure according to an embodiment of the present disclosure.

FIG. 13 is a schematic structural diagram of a configuration apparatus for a frame structure according to an embodiment of the present disclosure. The apparatus is applied to a first node. As shown in FIG. 13, the apparatus includes a receiving module 1302 and a processing module 1304. The receiving module 1302 is configured to receive frame structure parameters configured by a second node, wherein each frame structure parameter includes a period and a type of the frame structure, and the frame structure parameters include a common frame structure parameter, a first dedicated frame structure parameter and a second dedicated frame structure parameter. The processing module 1304 is coupled with the receiving module 1302 and is configured to obtain uplink/downlink division of the frame structure according to the common frame structure parameter and/or the first dedicated frame structure parameter, and determine the frame structure for uplink transmission of a backhaul link and the frame structure for downlink transmission of the backhaul link according to the second dedicated frame structure parameter.

It should be noted that the period of the frame structure is an integral multiple of the duration of a slot. The type of the frame structure includes an uplink (UL) frame structure, a downlink (DL) frame structure, and a flexible frame structure. The type of the frame structure in the second dedicated frame structure parameter may include at least one of an uplink backhaul frame structure and a downlink backhaul frame structure.

In some exemplary implementations of the embodiment, a case where a lower-level node of the first node is a transmission node of the same type as the first node rather than a terminal, the transmission direction of the second dedicated frame structure parameter is used for overwriting the transmission direction of the common frame structure parameter and the transmission direction of the first dedicated frame structure parameter.

The apparatus in the embodiment may further include a determining module. The determining module is configured to determine, according to a combination of the frame structure parameters, at least one of the following: a transmission time unit finally used for uplink/downlink within one period; a transmission time unit finally used for backhaul uplink transmission or backhaul downlink reception within one period; a potential position that a current node finally uses to schedule an uplink time unit within one period, or a potential position that a current node finally uses to schedule a downlink time unit within one period. The combination of the frame structure parameters includes at least one of the following: a common frame structure parameter, a first dedicated frame structure parameter and a second dedicated frame structure parameter; a common frame structure parameter and a second dedicated frame structure parameter; a first dedicated frame structure parameter and a second dedicated frame structure parameter.

In a case where a lower-level node of the first node is a transmission node of the same type as the first node rather than a user terminal, and a backhaul resource of the first node overlaps or partially overlaps with a backhaul resource of the lower-level transmission node, a transceiving state of the first node is opposite to a transceiving state of the lower-level transmission node, wherein the transceiving state of the first node being opposite to the transceiving state of the lower-level transmission node refers to that: when the first node performs a reception operation on the backhaul resource, the lower-level transmission node performs a transmission operation in a region in which the backhaul resource of the first node overlaps or partially overlaps with the backhaul resource of the lower-level node.

In a case where a lower-level node of the first node is a transmission node of the same type as the first node rather than a user terminal, and a backhaul resource of the first node does not overlap with a backhaul resource of the lower-level transmission node, a transceiving state of the first node is opposite to or the same as a transceiving state of the lower-level transmission node.

In some exemplary implementations of the embodiment, the common frame structure parameter is based on a dual period or a single period.

In some exemplary implementations of the embodiment, the apparatus configures the frame structure in at least the following manners: autonomously configuring a frame structure of a lower-level node according to the common frame structure parameter and/or the first dedicated frame structure parameter and/or the second dedicated frame structure parameter; autonomously configuring a frame structure of a lower-level node according to the first dedicated frame structure parameter and/or a dynamic frame structure parameter, wherein the dynamic frame structure parameter is configured via a Physical Downlink Control Channel (PDCCH); configuring a frame structure of a lower-level node according to the common frame structure parameter, the first dedicated frame structure parameter and a dynamic frame structure parameter, wherein the configured frame structure comprises an uplink (UL) frame structure, a downlink (DL) frame structure, a flexible frame structure, a backhaul UL frame structure, a backhaul DL frame structure, a backhaul multiplexing frame structure; autonomously configuring a frame structure of a lower-level node according to the common frame structure parameter, and/or the first dedicated frame structure parameter, and/or a dynamic frame structure parameter, wherein the dynamic frame structure parameter is configured via a PDCCH.

It should be noted that the configured frame structure includes an uplink (UL) frame structure, a downlink (DL) frame structure, a flexible frame structure, a backhaul UL frame structure, a backhaul DL frame structure, a backhaul multiplexing frame structure.

It should be noted that the described method of the previous embodiment is described from the perspective of the first node, while the present embodiment is described from the perspective of the second node. The present embodiment provides a configuration apparatus for a frame structure. The apparatus is applied to the second node, and includes: a configuring module, configured to configure frame structure parameters for the first node, wherein each frame structure parameter includes a period and a type of the frame structure, and the frame structure parameters include a common frame structure parameter, a first dedicated frame structure parameter and a second dedicated frame structure parameter.

The common frame structure parameter and the first dedicated frame structure parameter are used for obtaining an uplink/downlink division of the frame structure, and the second dedicated frame structure parameter is used for determining the frame structure for uplink transmission of a backhaul link and the frame structure for downlink transmission of the backhaul link.

The period of the frame structure is an integral multiple of the duration of a slot. The type of the frame structure includes an uplink (UL) frame structure, a downlink (DL) frame structure, and a flexible frame structure. The type of the frame structure in the second dedicated frame structure parameter may include at least one of an uplink backhaul frame structure and a downlink backhaul frame structure.

It is to be noted that each of the above modules may be implemented by software or hardware. For the latter, the modules may be implemented by, but not limited to, either of the following manners: the above modules are all located in the same processor; or, the above modules are located in different processors in any combination form respectively.

Another embodiment of the present disclosure provides a storage medium. The storage medium stores a computer program. The computer program is configured to execute the operations in any one of the method embodiments at runtime.

In the embodiment, the described storage medium may be provided to store computer programs for executing the following operations S1 and S2.

In operation S1, a first node receives frame structure parameters configured by a second node, wherein each frame structure parameter includes a period and a type of the frame structure, and the frame structure parameters include a common frame structure parameter, a first dedicated frame structure parameter and a second dedicated frame structure parameter.

In operation S2, the first node obtains an uplink/downlink division of the frame structure according to the common frame structure parameter and/or the first dedicated frame structure parameter, and determines, according to the second dedicated frame structure parameter, the frame structure for uplink transmission of a backhaul link and the frame structure for downlink transmission of the backhaul link.

Another embodiment of the present disclosure provides a storage medium. The storage medium stores a computer program. The computer program is configured to execute the operations in any one of the method embodiments at runtime.

In the present embodiment, the described storage medium may be provided to store a computer program for executing the following operations S1.

In operation S1, a second node configures frame structure parameters for a first node, wherein each frame structure parameter includes a period and a type of a frame structure, and the frame structure parameters include a common frame structure parameter, a first dedicated frame structure parameter and a second dedicated frame structure parameter.

In some exemplary implementations of the embodiment, the storage medium may include, but is not limited to, any medium that can store a computer program, such as a USB flash drive, a Read-Only Memory (ROM for short), a Random Access Memory (RAM for short), a removable hard disk, a magnetic disk, or an optical disc.

Optionally, specific implementations for the present embodiment may refer to the examples described in the above embodiments and alternative implementations, and details are not repeated in the present embodiment.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

What is claimed:

1. A configuration method for a frame structure, comprising:
   receiving, by a first node, frame structure parameters configured by a second node, wherein each frame structure parameter comprises a period and a type of a frame structure, and the frame structure parameters comprise at least one of the following: a common frame structure parameter, a first dedicated frame structure parameter, and a second dedicated frame structure parameter; and
   obtaining, by the first node, an uplink/downlink division of the frame structure according to the common frame structure parameter and/or the first dedicated frame structure parameter, and determining, by the first node according to the second dedicated frame structure parameter, the frame structure for uplink transmission of a backhaul link and the frame structure for downlink transmission of the backhaul link.

2. The method according to claim 1, wherein the period of the frame structure is an integer multiple of a duration of a slot; and the type of the frame structure comprises an uplink (UL) frame structure, a downlink (DL) frame structure, and a flexible frame structure.

3. The method according to claim 2, wherein the type of the frame structure in the second dedicated frame structure parameter comprises at least one of an uplink backhaul frame structure and a downlink backhaul frame structure.

4. The method according to claim 3, wherein each frame structure parameter further comprises a transmission direction, and the transmission direction of the second dedicated frame structure parameter is used for overwriting the transmission direction of the common frame structure parameter and the transmission direction of the first dedicated frame structure parameter in a case where a lower-level node of the first node is a transmission node of the same type as the first node rather than a terminal.

5. The method according to claim 1, further comprising:
   determining, by the first node according to a combination of the frame structure parameters, at least one of:
   a transmission time unit finally used for uplink/downlink within one period;
   a transmission time unit finally used for backhaul uplink transmission or backhaul downlink reception within one period;
   a potential position that a current node finally uses to schedule an uplink time unit within one period, or a potential position that the current node finally uses to schedule a downlink time unit within one period;
   wherein the combination of the frame structure parameters comprises at least one of the following: the common frame structure parameter, the first dedicated frame structure parameter and the second dedicated frame structure parameter; the common frame structure parameter and the second dedicated frame structure parameter; the first dedicated frame structure parameter and the second dedicated frame structure parameter.

6. The method according to claim 1, wherein
   in a case where a lower-level node of the first node is a transmission node of the same type as the first node rather than a user terminal, and a backhaul resource of the first node overlaps or partially overlaps with a backhaul resource of the lower-level transmission node, a transceiving state of the first node is opposite to a transceiving state of the lower-level transmission node, wherein the transceiving state of the first node being opposite to the transceiving state of the lower-level transmission node refers to that: when the first node performs a reception operation on the backhaul resource, the lower-level transmission node performs a transmission operation in a region in which the backhaul resource of the first node overlaps or partially overlaps with the backhaul resource of the lower-level node;
   in a case where a lower-level node of the first node is a transmission node of the same type as the first node rather than a user terminal, and a backhaul resource of the first node does not overlap with a backhaul resource of the lower-level transmission node, a transceiving state of the first node is opposite to or the same as a transceiving state of the lower-level transmission node;
   in a case where a lower-level node of the first node is a user terminal, a frame structure configured for the user terminal is consistent with the uplink/downlink division of the first node.

7. The method according to claim 1, wherein
   the second dedicated frame structure parameter is formed by a combination of the common frame structure parameter and the first dedicated frame structure parameter; and/or the second dedicated frame structure parameter is a dynamic signaling;
   wherein the dynamic signaling is a frame structure configuration parameter carried by Downlink Control Information (DCI).

8. The method according to claim 1, wherein the first node configures a frame structure in at least one of the following manners:
   autonomously configuring, by the first node, a frame structure of a lower-level node according to the common frame structure parameter and/or the first dedicated frame structure parameter and/or the second dedicated frame structure parameter;
   autonomously configuring, by the first node, a frame structure of a lower-level node according to the first dedicated frame structure parameter and/or a dynamic frame structure parameter, wherein the dynamic frame structure parameter is configured via a Physical Downlink Control Channel (PDCCH);
   configuring, by the first node, a frame structure of a lower-level node according to the common frame structure parameter, the first dedicated frame structure parameter and a dynamic frame structure parameter, wherein the configured frame structure comprises an uplink (UL) frame structure, a downlink (DL) frame structure, a flexible frame structure, a backhaul UL frame structure, a backhaul DL frame structure, a backhaul multiplexing frame structure;
   autonomously configuring, by the first node, a frame structure of a lower-level node according to the common frame structure parameter, and/or the first dedicated frame structure parameter, and/or a dynamic frame structure parameter, wherein the dynamic frame structure parameter is configured via a PDCCH.

9. The method according to claim 1, wherein
   the first node reports expected power adjustment to an upper-level node of the first node on a corresponding downlink backhaul transmission resource;
   wherein the power adjustment comprises one of the following: a received power adjustment value of a corresponding bandwidth, a transmitted power adjustment value of the corresponding bandwidth, an expected received power of the corresponding bandwidth, and an expected transmitted power of the corresponding bandwidth, wherein the corresponding bandwidth is a bandwidth of one Resource Block (RB).

10. The method according to claim 1, wherein
the first node indicates, for a lower-level node, power adjustment for a downlink backhaul transmission resource; wherein a value of the power adjustment comprises one of the following: a received power adjustment value of a corresponding bandwidth, a transmitted power adjustment value of the corresponding bandwidth, an expected received power of the corresponding bandwidth and an expected transmitted power of the corresponding bandwidth; or the power adjustment is used for instructing the first node to indicate to the lower-level node whether to perform adjustment according to a required power adjustment value;
wherein the corresponding bandwidth is a bandwidth of one Resource Block (RB).

11. The method according to claim 1, further comprising:
receiving, by the first node, a power adjustment indication from an upper-level node, and multiplexing, by the first node according to the power adjustment indication, uplink transmission of a lower-level node of the first node on a corresponding resource;
receiving, by the first node, backhaul data transmitted by an upper-level node; and
scheduling, by the first node, uplink backhaul transmission of the lower-level node in a region in which a backhaul resource of the first node overlaps or partially overlaps with a backhaul resource of the lower-level node.

12. A configuration method for a frame structure, comprising:
configuring, by a second node, frame structure parameters for a first node, wherein each frame structure parameter comprises a period and a type of a frame structure, and the frame structure parameters comprise a common frame structure parameter, a first dedicated frame structure parameter and a second dedicated frame structure parameter;
wherein the common frame structure parameter and the first dedicated frame structure parameter are used for obtaining an uplink/downlink division of the frame structure, and the second dedicated frame structure parameter is used for determining the frame structure for uplink transmission of a backhaul link and the frame structure for downlink transmission of the backhaul link.

13. The method according to claim 12, wherein the period of the frame structure is an integer multiple of a duration of a slot; and the type of the frame structure comprises an uplink (UL) frame structure, a downlink (DL) frame structure, and a flexible frame structure.

14. The method according to claim 13, wherein the type of the frame structure in the second dedicated frame structure parameter comprises at least one of an uplink backhaul frame structure and a downlink backhaul frame structure.

15. A configuration apparatus for a frame structure, applied to a first node and comprising a memory storing instructions and a processor in communication with the memory, wherein the processor is configured to execute the instruction to:
receive frame structure parameters configured by a second node, wherein each frame structure parameter comprises a period and a type of a frame structure, and the frame structure parameters comprise a common frame structure parameter, a first dedicated frame structure parameter and a second dedicated frame structure parameter; and
obtain an uplink/downlink division of the frame structure according to the common frame structure parameter and/or the first dedicated frame structure parameter, and determine, according to the second dedicated frame structure parameter, the frame structure for uplink transmission of a backhaul link and the frame structure for downlink transmission of the backhaul link.

16. The apparatus according to claim 15, wherein the period of the frame structure is an integer multiple of a duration of a slot; and the type of the frame structure comprises an uplink (UL) frame structure, a downlink (DL) frame structure, and a flexible frame structure;
the type of the frame structure in the second dedicated frame structure parameter comprises at least one of an uplink backhaul frame structure and a downlink backhaul frame structure;
in a case where a lower-level node of the first node is a transmission node of the same type as the first node rather than a terminal, the transmission direction of the second dedicated frame structure parameter is used for overwriting the transmission direction of the common frame structure parameter and the transmission direction of the first dedicated frame structure parameter.

17. The apparatus according to claim 15, further comprising:
a determination module, configured to determine at least one of:
a transmission time unit finally used for uplink/downlink within one period;
a transmission time unit finally used for backhaul uplink transmission or backhaul downlink reception within one period;
a potential position that a current node finally uses to schedule an uplink time unit within one period, or a potential position that a current node finally uses to schedule a downlink time unit within one period;
wherein the combination of the frame structure parameters comprises at least one of the following: the common frame structure parameter, the first dedicated frame structure parameter and the second dedicated frame structure parameter; the common frame structure parameter and the second dedicated frame structure parameter; the first dedicated frame structure parameter and the second dedicated frame structure parameter.

18. The apparatus according to claim 15, wherein in a case where a lower-level node of the first node is a transmission node of the same type as the first node rather than a user terminal, and a backhaul resource of the first node overlaps or partially overlaps with a backhaul resource of the lower-level transmission node, a transceiving state of the first node is opposite to a transceiving state of the lower-level transmission node, wherein the transceiving state of the first node being opposite to the transceiving state of the lower-level transmission node refers to that: when the first node performs a reception operation on the backhaul resource, the lower-level transmission node performs a transmission operation in a region in which the backhaul resource of the first node overlaps or partially overlaps with the backhaul resource of the lower-level node;
in a case where a lower-level node of the first node is a transmission node of the same type as the first node rather than a user terminal, and a backhaul resource of the first node does not overlap with a backhaul resource of the lower-level transmission node, a transceiving state of the first node is opposite to or the same as a transceiving state of the lower-level transmission node;

in a case where a lower-level node of the first node is a user terminal, a frame structure configured for the user terminal is consistent with the uplink/downlink division of the first node.

19. The apparatus according to claim 15, wherein the apparatus configures the frame structure by at least one of:
   autonomously configuring a frame structure of a lower-level node according to the common frame structure parameter and/or the first dedicated frame structure parameter and/or the second dedicated frame structure parameter;
   autonomously configuring a frame structure of a lower-level node according to the first dedicated frame structure parameter and/or a dynamic frame structure parameter, wherein the dynamic frame structure parameter is configured via a Physical Downlink Control Channel (PDCCH);
   configuring a frame structure of a lower-level node according to the common frame structure parameter, the first dedicated frame structure parameter and a dynamic frame structure parameter, wherein the configured frame structure comprises an uplink (UL) frame structure, a downlink (DL) frame structure, a flexible frame structure, a backhaul UL frame structure, a backhaul DL frame structure, a backhaul multiplexing frame structure;
   autonomously configuring a frame structure of a lower-level node according to the common frame structure parameter, and/or the first dedicated frame structure parameter, and/or a dynamic frame structure parameter, wherein the dynamic frame structure parameter is configured via a PDCCH.

20. A configuration apparatus for a frame structure, applied to a second node and comprising a memory storing instructions and a processor in communication with the memory, wherein the processor is configured to execute the instruction to execute the method according to claim 12.

* * * * *